(12) United States Patent
Nakagawa

(10) Patent No.: US 11,067,020 B2
(45) Date of Patent: Jul. 20, 2021

(54) CONTROL DEVICE OF INTERNAL COMBUSTION ENGINE, INTERNAL COMBUSTION ENGINE, AND VEHICLE

(71) Applicant: TOYOTA JIDOSHA KABUSHIKI KAISHA, Toyota (JP)

(72) Inventor: Norihisa Nakagawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/581,865

(22) Filed: Sep. 25, 2019

(65) Prior Publication Data

US 2020/0116092 A1 Apr. 16, 2020

(30) Foreign Application Priority Data

Oct. 10, 2018 (JP) .............................. JP2018-191892

(51) Int. Cl.
*F02D 41/02* (2006.01)
*B01D 46/00* (2006.01)
(Continued)

(52) U.S. Cl.
CPC ....... *F02D 41/029* (2013.01); *B01D 46/0063* (2013.01); *B01D 46/442* (2013.01); *B01D 46/448* (2013.01); *F01N 3/32* (2013.01); *F01N 3/34* (2013.01); *F01N 9/002* (2013.01); *F02D 41/025* (2013.01); *F02D 41/1454* (2013.01); *F02D 41/3005* (2013.01); *F02P 5/045* (2013.01); *G07C 5/006* (2013.01); *B01D 2279/30* (2013.01); *F01N 2900/1411* (2013.01);
(Continued)

(58) Field of Classification Search
CPC combination set(s) only.
See application file for complete search history.

(56) References Cited

U.S. PATENT DOCUMENTS 5,090,200 A * 2/1992 Arai ..................... F01N 3/027
60/286
5,489,319 A * 2/1996 Tokuda .................. F01N 3/027
96/400

(Continued)

FOREIGN PATENT DOCUMENTS

DE 10 2015 212 514 A1 1/2017
DE 10 2015 215 373 A1 2/2017
(Continued)

*Primary Examiner* — Binh Q Tran
(74) *Attorney, Agent, or Firm* — Oliff PLC

(57) ABSTRACT

An internal combustion engine comprises a filter and is configured to enable attachment of a secondary air feed system feeding air into exhaust gas flowing into the filter. A control device of the engine is configured, in the PM removal control for removing particulate matter deposited on the filter, to perform temperature raising processing for controlling the engine so that the air-fuel ratio of the exhaust gas discharged from the engine body 1 is a rich air-fuel ratio and for feeding air from the secondary air feed system, and to perform regeneration processing for controlling the engine so that the air-fuel ratio of the exhaust gas discharged from the engine body is a stoichiometric air-fuel ratio and for feeding air from the secondary air feed system so that the air-fuel ratio of the exhaust gas flowing into the filter is a lean air-fuel ratio.

14 Claims, 15 Drawing Sheets

(51) Int. Cl.
*B01D 46/44* (2006.01)
*F01N 3/32* (2006.01)
*F01N 3/34* (2006.01)
*F01N 9/00* (2006.01)
*F02D 41/14* (2006.01)
*F02D 41/30* (2006.01)
*F02P 5/04* (2006.01)
*G07C 5/00* (2006.01)

(52) U.S. Cl.
CPC ............ *F01N 2900/1602* (2013.01); *F01N 2900/1606* (2013.01); *F01N 2900/1804* (2013.01); *F02D 41/146* (2013.01); *F02D 41/1448* (2013.01); *F02D 2200/0802* (2013.01); *F02D 2200/0812* (2013.01); *F02D 2200/101* (2013.01)

(56) References Cited

U.S. PATENT DOCUMENTS

| | | | |
|---|---|---|---|
| 7,980,060 B2 * | 7/2011 | Tachimoto | F01N 11/002 60/277 |
| 8,783,020 B2 * | 7/2014 | Springer | F01N 3/021 60/287 |
| 2006/0168947 A1 * | 8/2006 | Durnholz | F01N 11/002 60/289 |
| 2010/0186386 A1 * | 7/2010 | Tsujimoto | F01N 3/0814 60/286 |
| 2011/0072788 A1 * | 3/2011 | Ruona | F01N 9/00 60/276 |
| 2019/0203629 A1 | 7/2019 | Zink | |

FOREIGN PATENT DOCUMENTS

| | | |
|---|---|---|
| DE | 10 2016 211 274 A1 | 12/2017 |
| JP | 2010-13974 A | 1/2010 |

* cited by examiner

CONTROL DEVICE OF INTERNAL COMBUSTION ENGINE, INTERNAL COMBUSTION ENGINE, AND VEHICLE

FIELD

The present disclosure relates to a control device of an internal combustion engine, an internal combustion engine, and a vehicle.

BACKGROUND

Known in the past has been an internal combustion engine provided with a filter for trapping particulate matter in exhaust gas in an exhaust passage of the internal combustion engine and designed to supply secondary air to the filter when regenerating the filter (for example, JP 2010-13974 A). By supplying secondary air to the filter, it is possible to burn off the particulate matter deposited on the filter.

In particular, in the internal combustion engine described in JP 2010-13974 A, in regenerating the filter, the air-fuel ratio of the exhaust gas discharged from the engine body is controlled to an air-fuel ratio richer than the stoichiometric air-fuel ratio (below, referred to as a "rich air-fuel ratio"). In addition, a secondary air feed system is used to feed secondary air to the filter. As a result, on the filter, unburned fuel in the exhaust gas reacts with the air and burns whereby the temperature of the filter can be raised to equal to or more than a regeneration temperature.

SUMMARY

Technical Problem

However, if the temperature of the filter rises to equal to or more than the regeneration temperature and then secondary air continues to be introduced in a large amount, the particulate matter deposited on the filter will react with the oxygen, the temperature of the filter will excessively rise, and the filter will be deteriorated. Further, it is difficult to adjust a flow rate of feed of secondary air so that the temperature of the filter is maintained at a constant temperature which is equal to or more than the regeneration temperature. If the flow rate of feed of secondary air is slightly greater than a suitable amount, the temperature of the filter will excessively rise and the filter will be deteriorated.

In consideration of the above problem, an object of the present disclosure is to remove particulate matter deposited on the filter while keeping a temperature of a filter from excessively rising.

Solution to Problem

The gist of the present disclosure is as follows.

(1) A control device of an internal combustion engine for controlling an internal combustion engine, the engine comprising a particulate filter arranged in an exhaust passage of the internal combustion engine and configured to enable attachment of a secondary air feed system feeding air into exhaust gas flowing into the particulate filter, wherein
the control device of an internal combustion engine is configured, in the PM removal control for removing particulate matter deposited on the particulate filter, to perform temperature raising processing for controlling the internal combustion engine so that the air-fuel ratio of the exhaust gas discharged from the engine body is a rich air-fuel ratio richer than the stoichiometric air-fuel ratio and for feeding air from the secondary air feed system, and to perform regeneration processing for controlling the internal combustion engine so that the air-fuel ratio of the exhaust gas discharged from the engine body is leaner than during the temperature raising processing and for feeding air from the secondary air feed system so that the air-fuel ratio of the exhaust gas flowing into the particulate filter is a lean air-fuel ratio leaner than the stoichiometric air-fuel ratio.

(2) The control device of an internal combustion engine according to above (1), wherein the control device is configured to repeatedly perform the temperature raising processing and the regeneration processing, in the PM removal control.

(3) The control device of an internal combustion engine according to above (1) or (2), wherein control device controls the secondary air feed system so that in the regeneration processing the flow rate of feed of air from the secondary air feed system is greater when the amount of deposition of particulate matter at the particulate filter is relatively small, compared to when it is relatively large.

(4) The control device of an internal combustion engine according to above (1) or (2), wherein the control device controls the secondary air feed system so that in regeneration processing the flow rate of feed of air from the secondary air feed system is greater when the number of times of performing the regeneration processing from the start of PM removal control is relatively large, compared to when it is relatively small.

(5) The control device of an internal combustion engine according to any one of above (1) to (4), wherein the control device feeds air from the secondary air feed system so that in the temperature raising processing, the air-fuel ratio of the exhaust gas flowing into the particulate filter is the stoichiometric air-fuel ratio.

(6) The control device of an internal combustion engine according to any one of above (1) to (5), wherein
the internal combustion engine further comprises spark plugs igniting an air-fuel mixture in combustion chambers, and
the control device delays the ignition timing by the spark plugs during the temperature raising processing from the ignition timing by the spark plugs during the regeneration processing.

(7) The control device of an internal combustion engine according to any one of above (1) to (6), wherein the control device controls the internal combustion engine so that the rotation speed of the internal combustion engine in the temperature raising processing is higher than the rotation speed of the internal combustion engine during the regeneration processing.

(8) The control device of an internal combustion engine according to any one of above (1) to (7), wherein the control device controls the internal combustion engine and the secondary air feed system so that a peak temperature of the filter due to the temperature raising processing is higher when the amount of deposition of the particulate matter to the particulate filter is relatively small, compared to when it is relatively large.

(9) The control device of an internal combustion engine according to any one of above (1) to (7), wherein the control device controls the internal combustion engine and the secondary air feed system so that a peak temperature of the filter due to the temperature raising processing is higher when the number of times of performing regeneration processing from the start of PM removal control is relatively large, compared to when it is relatively small.

(10) The control device of an internal combustion engine according to any one of above (1) to (9), wherein the control device performs fuel cut control for temporarily stopping the feed of fuel to the internal combustion engine in the state where the internal combustion engine is operated, during regeneration processing after the amount of deposition of particulate matter at the particulate filter becomes equal to or less than a predetermined amount.

(11) The control device of an internal combustion engine according to any one of above (1) to (9), wherein the control device performs fuel cut control for temporarily stopping the feed of fuel to the internal combustion engine in the state where the internal combustion engine is operated, during regeneration processing after the number of times of performing regeneration processing from the start of PM removal control becomes equal to or more than a predetermined number of times.

(12) The control device of an internal combustion engine according to any one of above (1) to (11), wherein the control device reduces the flow rate of feed of air from the secondary air feed system or stops the feed of air from the secondary air feed system, when the rotation speed of the internal combustion engine falls to equal to or less than a preset reference rotation speed during PM removal control, compared to when it is higher than the reference rotation speed.

(13) An internal combustion engine comprising a control device according to any one of above (1) to (12) and a particulate filter arranged in an exhaust passage, wherein
the internal combustion engine is configured to enable a secondary air feel system to be attached to feed air into the exhaust gas flowing into the particulate filter, and the secondary air feed system is not attached to the internal combustion engine when the PM removal control is not performed.

(14) A vehicle mounting an internal combustion engine and a control device according to any one of above (1) to (12), wherein
the vehicle comprises a device for warning a user of the vehicle,
the internal combustion engine comprises a deposition detection device for detecting an amount of deposition of particulate matter on a particulate filter, and
the control device issues a warning, which shows that the user should perform PM removal control, by the warning device, when the amount of deposition of particulate matter detected by the deposition detection device is equal to or more than a preset reference amount.

Advantageous Effects of Invention

According to the present disclosure, it becomes possible to removing particulate matter deposited on the filter while keeping a temperature of a filter from excessively rising.

DESCRIPTION OF EMBODIMENT

Figure 1:
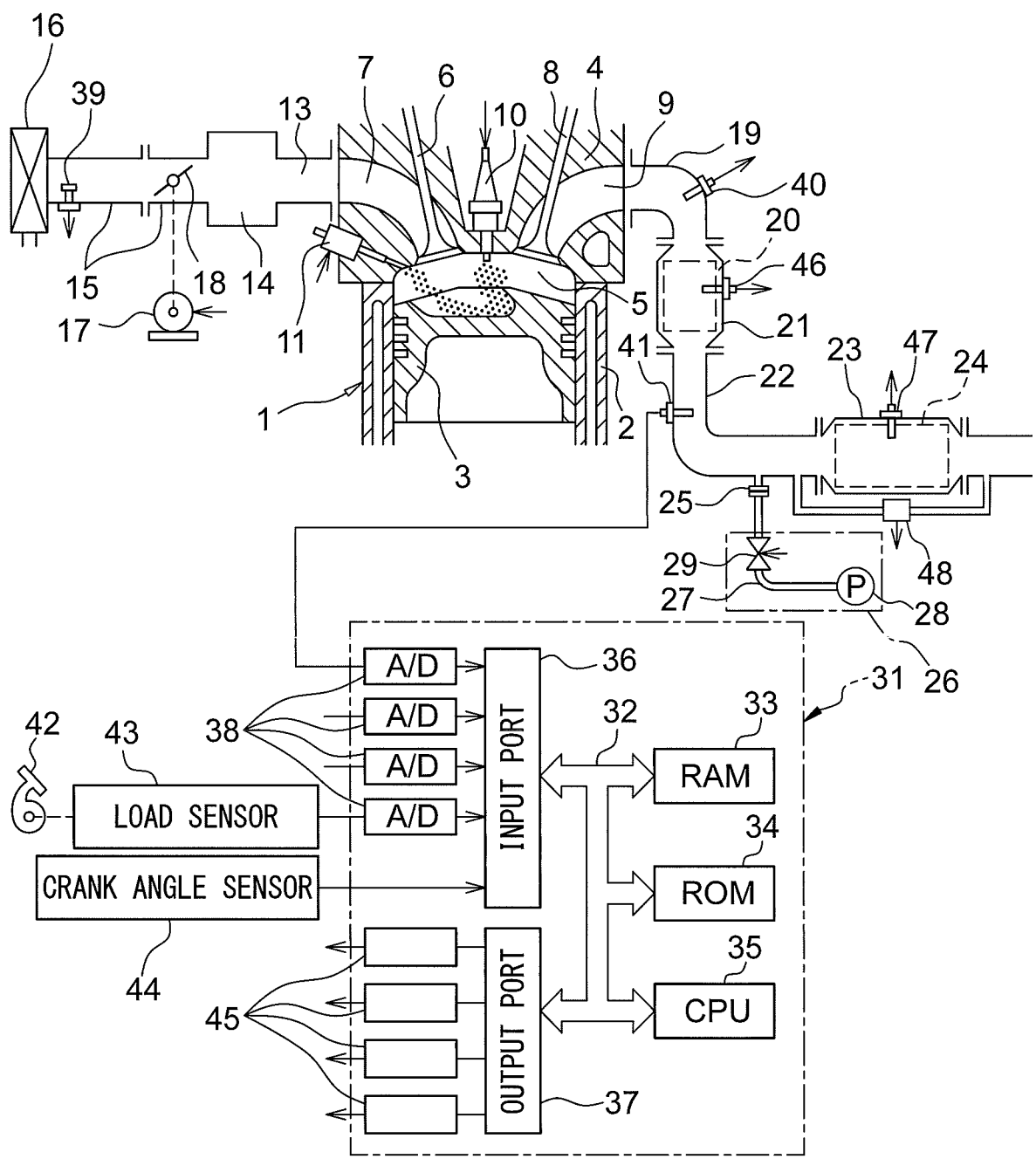
FIG. 1 is a view schematically showing an internal combustion engine in which an exhaust purification system according to one embodiment is used.

Below, referring to the drawings, embodiments of the present invention will be explained in detail. Note that, in the following explanation, similar component elements are assigned the same reference numerals.

<Explanation of Internal Combustion Engine as a Whole>

FIG. 1 is a view which schematically shows an internal combustion engine in which an exhaust purification system according to one embodiment of the present invention is used. Referring to FIG. 1, 1 indicates an engine body, 2 a cylinder block, 3 a piston which reciprocates in the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, gasoline with a stoichiometric air-fuel ratio of 14.6, is used as the fuel. However, the internal combustion engine using the exhaust purification system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of branched portions which are connected to gathered portion to which the branched portions are gathered. The gathered portion of the exhaust manifold 19 is connected to an upstream side casing 21 which houses an exhaust purification catalyst 20. The upstream side casing 21 is connected through an exhaust pipe 22 to a downstream side casing 23 which houses a particulate filter (below, also referred to as a "filter") 24. Between the exhaust purification catalyst 20 and the filter 24, a connection part 25 for connecting a secondary air feed system 25, which will be described below, is provided. The exhaust port 9, exhaust manifold 19, upstream side casing 21, exhaust pipe 22, and downstream side casing 23 form an exhaust passage.

The secondary air feed system 26 is configured to be able to be attached to the exhaust pipe 22 through a connection part 25 provided at the exhaust pipe 22. The secondary air feed system 26 is normally not attached to the exhaust pipe 22. For example, the system is attached to the exhaust pipe 22 when maintenance is performed on the vehicle, which mounts the internal combustion engine, at an auto repair shop.

The secondary air feed system 26 is provided with a feed pipe 27, air pump 28, and flow rate control valve 29. The feed pipe 27 is configured to be able to be connected at one end to the connection part 25 of the exhaust pipe 22 and is provided with an air pump 28 at the other end. Further, in the middle of the feed pipe 27, a flow rate control valve 29 is provided. If the flow rate control valve 29 is opened, air pressurized by the air pump 28 flows through the connection part 25 into the exhaust pipe 22. In particular, in the present embodiment, the connection part 25 is provided at the upstream side from the filter 24 in the direction of flow of exhaust, therefore the secondary air feed system 26 feeds secondary air to the exhaust gas flowing into the filter 24.

The electronic control unit (ECU) 31 is comprised of a digital computer which is provided with components such as a RAM (random access memory) 33, ROM (read only memory) 34, CPU (microprocessor) 35, input port 36, and output port 37, which are connected together through a bidirectional bus 32.

In the intake pipe 15, an air flow meter 39 is arranged for detecting the flow rate of air which flows through the intake pipe 15. The output of this air flow meter 39 is input through a corresponding AD converter 38 to the input port 36. Further, at a gathering part of the exhaust manifold 19, an upstream side air-fuel ratio sensor 40 is arranged, which detects the air-fuel ratio of the exhaust gas flowing through the exhaust manifold 19 (that is, the exhaust gas flowing into the exhaust purification catalyst 20). In addition, in the exhaust pipe 22, a downstream side air-fuel ratio sensor 41 is arranged, which detects the air-fuel ratio of the exhaust gas flowing through the exhaust pipe 22 (that is, the exhaust gas flowing out from the exhaust purification catalyst 20 and flowing into the filter 24). The outputs of these air-fuel ratio sensors 40 and 41 are also input through the corresponding AD converters 38 to the input port 36.

Further, the exhaust purification catalyst 20 is provided with a catalyst temperature sensor 46 for detecting the temperature of the exhaust purification catalyst 20. Moreover, the filter 24 is provided with a filter temperature sensor 47 for detecting the temperature of the filter 24. Further, in the exhaust pipe 22 at the upstream side and downstream side of the filter 24, a differential pressure sensor 48 is provided for detecting the differential pressure between forward and backward of the filter 24. The outputs of these temperature sensors 46, 47 and differential pressure sensor 48, and NOx sensor 49 are also input through corresponding AD converters 38 to the input port 36.

Further, a load sensor 43 generating an output voltage proportional to the amount of depression of the accelerator pedal 42 is connected to the accelerator pedal 42. The output voltage of the load sensor 43 is input through a corresponding AD converter 38 to the input port 36. The crank angle sensor 44, for example, generates an output pulse every time the crank shaft rotates by 15 degrees. This output pulse is input to the input port 36. At the CPU 35, the engine rotation speed is calculated from the output pulse of this crank angle sensor 44.

On the other hand, the output port 37 is connected through corresponding drive circuits 45 to the spark plugs 10, fuel injectors 11 and throttle valve drive actuator 17. In addition, when the secondary air feed system 26 is connected to the exhaust pipe 22, the wire extended from the drive circuit 45 is manually connected to the secondary air feed device 26. Therefore, at this time, the output port 37 is connected through the corresponding drive circuit 45 to the flow rate control valve 29 of the secondary air feed system 26. Therefore, the ECU 31 functions as a control device for controlling the operations of the spark plugs 10, fuel injectors 11, throttle valve drive actuator 17 and secondary air feed system 26.

The exhaust purification catalyst 20 is a three-way catalyst which comprises a carrier made of ceramic on which a noble metal (for example, platinum Pt) having a catalyst effect. A three-way catalyst has the function of simultaneously purifying unburned HC, CO and NOx when the air-fuel ratio of the exhaust gas flowing into the three-way catalyst is maintained at the stoichiometric air-fuel ratio. Note that as long as carrying a substance having catalytic function, the exhaust purification catalyst 20 may be a catalyst other than the three-way catalyst, such as oxidation catalyst or NOx storage reduction catalyst.

Figure 2A:
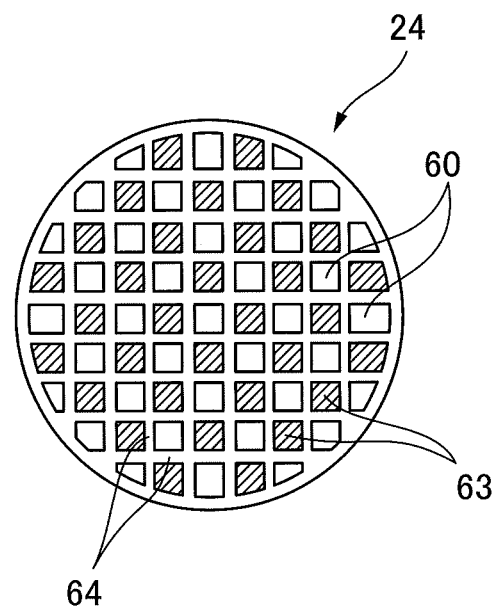
FIGS. 2A and 2B are views showing the structure of a filter.
Figure 2B:
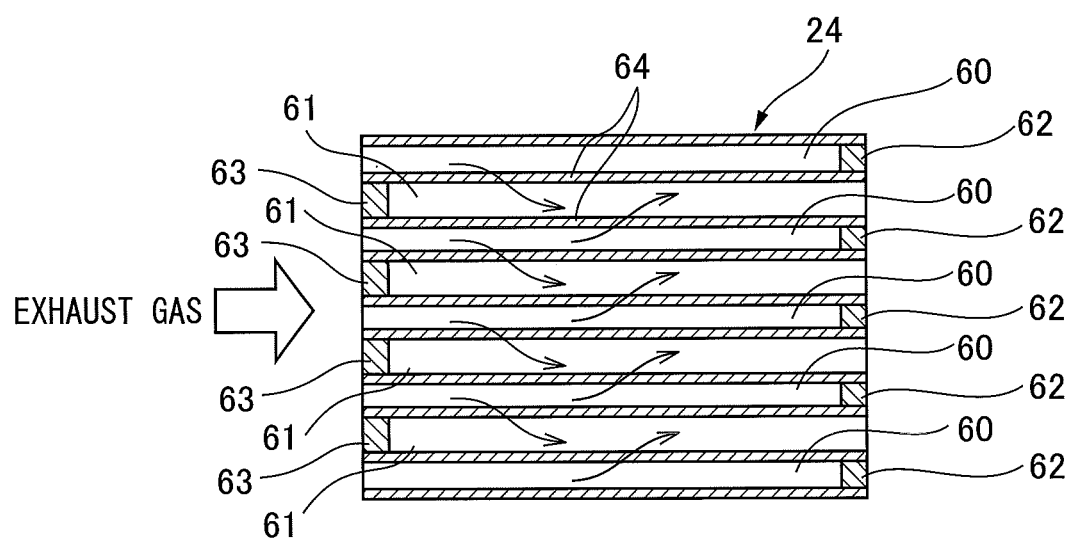

FIGS. 2A and 2B are views showing the structure of the filter 24. FIG. 2A is a front view of the filter 24, while FIG. 2B is a side cross-sectional view of the filter 24. As shown in FIGS. 2A and 2B, the filter 24 forms a honeycomb structure comprised of a plurality of exhaust flow passages 60, 61 extending in parallel to each other. These exhaust flow passages are comprised of exhaust gas inflow passages 60 with downstream ends closed by plugs 62 and exhaust gas outflow passages 61 with upstream ends closed by plugs 63. Note that, in FIG. 2A, the hatched parts show plugs 63. Therefore, the exhaust gas inflow passages 60 and exhaust gas outflow passages 61 are alternately arranged via thin partition walls 64. In other words, the exhaust gas inflow passages 60 and the exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The filter 24 is, for example, formed from a porous material such as cordierite. Therefore, the exhaust gas flowing into the exhaust gas inflow passages 60, as shown in FIG. 2B by the arrows, passes through the surrounding partition walls 64 and flows out into the adjoining exhaust gas outflow passages 61. In this way, while the exhaust gas is flowing through the partition walls 64, the PM contained in the exhaust gas is trapped by the filter 24.

Further, the filter 24 supports a catalyst noble metal having a catalytic action (for example, platinum (Pt)).

Therefore, the filter 24 can not only trap PM in the exhaust gas, but can also oxidize and remove the unburned HC or CO in the exhaust gas. Note that, the filter 24 may be configured otherwise so long as trapping PM in the exhaust gas and supporting a substance having a catalytic action. Further, if arranging an exhaust purification catalyst having a catalytic action between the secondary air feed system 25 and the filter 24, the filter 24 need not support a substance having a catalytic action.

<Processing for Removing PM>

The PM trapped at the filter 24 deposits on the filter 24. If the PM deposition amount on the filter 24 increases, the pores in the partition walls 64 are clogged and the pressure loss of the exhaust gas due to the filter 24 becomes greater. The increase of the pressure loss makes output of the internal combustion engine decrease, due to the more difficult flow of the exhaust gas, and makes the combustion deteriorated. Therefore, to prevent a decrease in output of the internal combustion engine or deterioration of the combustion, if the PM deposition amount on the filter 24 becomes greater than the limit deposition amount, the PM deposited on the filter 24 has to be oxidized and removed. In this regard, the "limit deposition amount" is the amount such that if the PM deposition amount on the filter 24 increases beyond the limit deposition amount, the pressure loss due to the filter 24 will increase and the operating state of the internal combustion engine, etc., will be deteriorated.

Therefore, when the PM deposition amount on the filter 24 is greater, PM removal control is performed for oxidizing and removing the PM in the state where the secondary air feed system 26 is attached to the exhaust pipe 22 at an auto repair shop, etc. Below, the PM removal control will be explained by referring to FIGS. 3 to 6.

Figure 3:
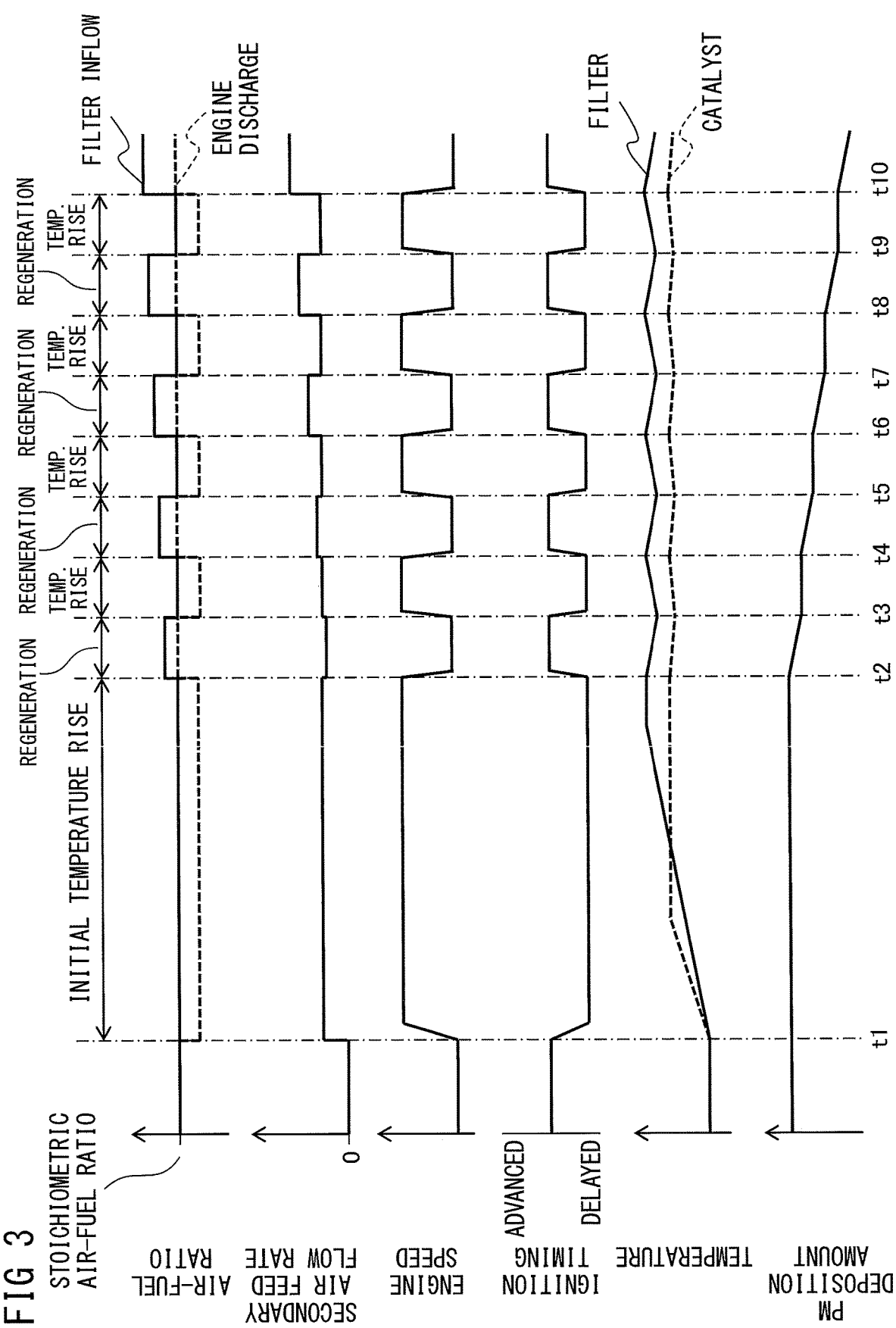
FIG. 3 is a time chart showing the trends of parameters when performing PM removal control.

FIG. 3 is a time chart showing the trends in parameters at the time of performing PM removal control. FIG. 3 shows the trends in the air-fuel ratio of the exhaust gas, the flow rate of the feed of air from the secondary air feed system 26, the engine rotation speed, the ignition timing by the spark plugs 10, the temperatures of the exhaust purification catalyst 20 and filter 24, and the PM deposition amount of on the filter 24. In the figure, regarding the air-fuel ratio, the broken line shows the air-fuel ratio of the exhaust gas discharged from the engine body 1, while the solid line shows the air-fuel ratio of the exhaust gas flowing into the filter 24. Further, regarding the temperature, the broken line shows the temperature of the exhaust purification catalyst 20, while the solid line shows the temperature of the filter 24.

<<Initial Temperature Raising Processing>>

If at the timing t1 the PM removal control is started, first, the initial temperature raising processing for raising the temperature of the filter 24 is performed. The PM deposited on the filter 24 does not burn even if air is fed unless the temperature of the filter 24 is equal to or more than the PM combustion start temperature (for example, 600° C.), therefore in the initial temperature raising processing, the temperature of the filter 24 is raised up to equal to or more than the PM combustion start temperature.

In the initial temperature raising processing of the present embodiment, the amount of fuel injected from the fuel injectors 11 is controlled so that the air-fuel ratio of the exhaust gas discharged from the engine body 1 becomes an air-fuel ratio richer than the stoichiometric air-fuel ratio (rich air-fuel ratio). Specifically, for example, the amount of fuel injected from the fuel injectors 11 is controlled so that the air-fuel ratio of the exhaust gas becomes 12.5. In addition, in the initial temperature raising processing, air is fed from the secondary air feed system 26 so that the air-fuel ratio of the exhaust gas flowing into the filter 24 becomes the stoichiometric air-fuel ratio. As a result, exhaust gas containing unburned HC or CO, etc., and air in large amounts flows into the filter 24. This unburned HC or CO, etc., reacts with the oxygen in the air on the filter 24 and burns, whereby the temperature of the filter 24 rises. Further, the air-fuel ratio of the exhaust gas flowing into the filter 24 is the stoichiometric air-fuel ratio, therefore the unburned HC or CO in the exhaust gas discharged from the engine body 1 can be removed in the filter 24.

In addition, in the initial temperature raising processing of the present embodiment, the internal combustion engine is controlled so that the engine rotation speed becomes a predetermined rotation speed (for example, 3000 rpm) higher than the rotation speed (for example, 600 rpm) during idling before the start of the initial temperature raising processing. By the engine rotation speed becoming higher in this way, the flow rate of the exhaust gas increases and as a result the flow rates of unburned HC, CO, and air flowing into the filter 24 increase. For this reason, in the filter 24, the amounts of combustion of the unburned HC and CO increase and the temperature of the filter 24 is raised in temperature early.

Further, in the initial temperature raising processing of the present embodiment, the ignition timing by the spark plugs 10 is delayed compared with idling before the start of the initial temperature raising processing. As a result, the combustion efficiency of the air-fuel mixture in the combustion chambers 5 is decreased, and the ratio of conversion to thermal energy of the exhaust gas in the combustion energy of the air-fuel mixture becomes greater. As a result, the temperature of the exhaust gas discharged from the engine body 1 becomes higher, and thereby the temperature of the filter 24 becomes higher. The extent of delaying the ignition timing is set so that the combustion efficiency of the air-fuel mixture becomes about seven-tenths of the combustion efficiency when not delaying the ignition timing.

Note that, in the present embodiment, in the initial temperature raising processing, air is fed from the secondary air feed system 26 so that the air-fuel ratio of the exhaust gas flowing into the filter 24 is the stoichiometric air-fuel ratio. However, as long as air is fed from the secondary air feed system 26 and the air-fuel ratio of the exhaust gas flowing into the filter 24 is leaner than the air-fuel ratio of the exhaust gas discharged from the engine body 1, the air-fuel ratio of the exhaust gas flowing into the filter 24 may be an air-fuel ratio richer than the stoichiometric air-fuel ratio or an air-fuel ratio slightly leaner than the same.

If the initial temperature raising processing is performed in this way, the temperature of the filter 24 gradually rises. Finally, it reaches a predetermined temperature of equal to or more than the PM combustion start temperature. However, during the initial temperature raising processing, most of the oxygen contained in the exhaust gas flowing into the filter 24 reacts with the unburned HC or CO, therefore almost no oxygen for burning the PM deposited on the filter 24 is contained. Therefore, during the initial temperature raising processing, almost no PM deposited on the filter 24 is burned. Accordingly, almost no PM is removed or only a small amount is removed.

<<Secondary Air Regeneration Control>>

Then, at the timing t2 when the time elapsed from when PM removal control was started, that is, the time elapsed from when the initial temperature raising processing was started, becomes a preset predetermined time, the secondary air regeneration control is started. Note that, the timing of start of the secondary air regeneration control may be any timing so long as a timing where the temperature of the filter 24 has been a predetermined temperature (for example, 800° C.) of equal to or more than the PM combustion start temperature. Therefore, the timing of start of the secondary air regeneration control may, for example, be the timing when the temperature detected by the temperature sensor (not shown) detecting the temperature of the filter 24 reaches a predetermined temperature of equal to or more than the PM combustion start temperature.

In the secondary air regeneration control, regeneration processing for feeding air from the secondary air feed system 26 to remove the PM deposited on the filter 24 and temperature raising processing raising the temperature of the filter 24 are alternately performed. At the timing t2, due to the initial temperature raising processing, the temperature of the filter 24 is high, therefore the regeneration processing is started.

<<Regeneration Processing>>

In the regeneration processing, the amount of injection of fuel from the fuel injectors 11 is controlled so that the air-fuel ratio of the exhaust gas discharged from the engine body 1 is the stoichiometric air-fuel ratio. As a result, in the exhaust purification catalyst 20, the unburned HC, CO or NOx in the exhaust gas can be removed. In addition, in the regeneration processing, air is fed from the secondary air feed system 26 so that the air-fuel ratio of the exhaust gas flowing into the filter 24 becomes an air-fuel ratio leaner than the stoichiometric air-fuel ratio (below, referred to as "lean air-fuel ratio"). Specifically, for example, air is fed from the secondary air feed system 26 so that the air-fuel ratio of the exhaust gas becomes 15.5 or so. As a result, exhaust gas containing large amounts of oxygen not reacting with the unburned HC or CO, etc., flows into the filter 24. This oxygen reacts with the PM deposited on the filter 24 to remove the PM. Therefore, as will be understood from FIG. 3, during the timings t2 to t3, the PM deposition amount on the filter 24 is gradually decreased.

Further, in the regeneration processing of the present embodiment, the number of times of performing the regeneration processing becomes greater, the flow rate of feed of air from the secondary air feed system is set to be greater. Therefore, the flow rate of feed of air in the regeneration processing becomes greater in the order of the flow rate of feed of air in the regeneration processing from the timings t2 to t3, the flow rate of feed of air in the regeneration processing from the timings t4 to t5, and the flow rate of feed of air from the timings t6 to t7.

Alternatively, in the regeneration processing, the flow rate of feed of air from the secondary air feed system may be greater, as the PM deposition amount on the filter 24 becomes smaller. In this case, the PM deposition amount on the filter 24 is detected based on, for example, the output of the differential pressure sensor 48.

Note that, in the present embodiment, the flow rate of the feed of air from the secondary air feed system is changed linearly in accordance with the number of times of performing the regeneration processing or the PM deposition amount on the filter 24. However, the flow rate of feed of air from the secondary air feed system may be changed in stages in accordance with the number of times of performing the regeneration processing or the PM deposition amount on the filter 24.

Therefore, in the present embodiment, it can be said that, in the regeneration processing, the secondary air feed system 26 is controlled so that the flow rate of feed of air from the secondary air feed system 26 becomes greater when the PM deposition amount on the filter is relatively small, compared to when it is relatively large. Alternatively, in the regeneration processing, it can be said that the secondary air feed system 26 is controlled so that the flow rate of feed of air from the secondary air feed system 26 becomes greater when the number of times of performing the regeneration processing after the PM removal control is started is relatively large, compared with when it is relatively small.

In addition, in the regeneration processing of the present embodiment, the internal combustion engine is controlled so that the engine rotation speed becomes a predetermined rotation speed lower than the rotation speed during the initial temperature raising processing (for example, 1000 rpm). In particular, in the present embodiment, the engine rotation speed during the regeneration processing is set to a rotation speed faster than the rotation speed during idling.

Further, in the regeneration processing of the present embodiment, the ignition timing by the spark plugs 10 is advanced compared with during the initial temperature raising processing. In particular, in the present embodiment, the ignition timing during the regeneration processing is set to substantially the same timing as the ignition timing during idling before the start of the initial temperature raising processing. As a result, the combustion efficiency of the air-fuel mixture in the combustion chambers 5 is higher compared with the initial temperature raising processing while the temperature of the exhaust gas discharged from the engine body 1 is lower.

In this regard, in the present embodiment, during the regeneration processing, the lean degree in the air-fuel ratio of the exhaust gas flowing into the filter 24 is not that large. Therefore, the combustion rate of PM on the filter 24 is not that fast. As a result, the temperature of the filter 24 is less likely to rise due to combustion of the PM. In addition, in the present embodiment, the engine rotation speed during the regeneration processing is slow, and therefore the flow rate of the exhaust gas flowing into the filter 24 is also slow. Therefore, the flow rate of oxygen flowing into the filter 24 also is not that great. Due to this as well, the combustion rate of PM is not that fast. Still further, in the present embodiment, the ignition timing during the regeneration processing is a relatively advanced timing, therefore the temperature of the exhaust gas discharged from the engine body 1 is low, and therefore the temperature of the exhaust gas flowing into the filter 24 is also low. Due to the above, during the regeneration processing, the PM burns on the filter 24, but the temperature of the filter 24 gradually falls.

Note that, in the present embodiment, during the regeneration processing, the amount of injection of fuel from the fuel injectors 11 is controlled so that the air-fuel ratio of the exhaust gas discharged from the engine body 1 is the stoichiometric air-fuel ratio. However, during the regeneration processing, the air-fuel ratio of the exhaust gas discharged from the engine body 1 does not necessarily have to be controlled to be the stoichiometric air-fuel ratio. It may be controlled to an air-fuel ratio other than the stoichiometric air-fuel ratio, as long as it is leaner than the air-fuel ratio of the exhaust gas discharged from the engine body 1 during the initial temperature raising processing or the temperature raising processing in the secondary air regeneration control.

If the regeneration processing is continued for the preset duration of regeneration and the timing t3 is reached, the regeneration processing is ended. In this regard, the duration of regeneration is a time where during the regeneration processing, the temperature of the filter 24 will not fall and become less than the PM combustion start temperature. Specifically, the duration of regeneration is, for example, 10 seconds. Note that, the duration of regeneration does not necessarily have to be constant. It may also be a time changing in accordance with the operating state of the internal combustion engine, etc. Further, the regeneration processing, for example, may be ended when the temperature detected by the temperature sensor for detecting the temperature of the filter 24 (not shown) becomes less than a preset temperature (for example, PM combustion start temperature).

<<Temperature Raising Processing>>

If the regeneration processing is ended at the timing t3, the temperature raising processing is started. In the temperature raising processing in the secondary air regeneration control, similarly to the initial temperature raising processing, the amount of injection of fuel from the fuel injectors 11 is controlled so that the air-fuel ratio of the exhaust gas discharged from the engine body 1 is the rich air-fuel ratio. Specifically, for example, the amount of injection of fuel from the fuel injectors 11 is controlled so that the air-fuel ratio of the exhaust gas is 12.5. In addition, in the initial temperature raising processing, air is fed from the secondary air feed system 26 so that the air-fuel ratio of the exhaust gas flowing into the filter 24 is the stoichiometric air-fuel ratio. Note that, even during the temperature raising processing in the secondary air regeneration control, similarly to the initial temperature raising processing, as long as air is fed from the secondary air feed system 26, the air-fuel ratio of the exhaust gas flowing into the filter 24 need not be the stoichiometric air-fuel ratio.

In addition, in the temperature raising processing in the secondary air regeneration control, similarly to the initial temperature raising processing, the internal combustion engine is controlled so that the engine rotation speed is a relatively high predetermined rotation speed (for example, 3000 rpm). Therefore, in the temperature raising processing in the secondary air regeneration control, the internal combustion engine is controlled so that the engine rotation speed is higher than the engine rotation speed in the regeneration processing. Still further, in the temperature raising processing in the secondary air regeneration control, similarly to the initial temperature raising processing, the ignition timing by the spark plugs 10 is delayed from the ignition timing during the idling before the start of the initial temperature raising processing or during the regeneration processing. As a result, in the temperature raising processing in the secondary air regeneration control, it is possible to make the filter 24 rise in temperature without causing the PM deposited on the filter 24 to burn much at all.

When the temperature raising processing continues for exactly the preset duration of temperature rise and reaches the timing t4, the temperature raising processing is ended and the regeneration processing is started. In this regard, the duration of temperature rise is set to the time necessary for the temperature of the filter 24 to rise and reach near a preset high predetermined temperature (for example, 800° C.) during the temperature raising processing. Specifically, the duration of the temperature rise is, for example, is 20 seconds. Note that, the duration of the temperature rise does not necessarily have to be constant. It may also be a time changing in accordance with the operating state of the internal combustion engine, etc. Further, the temperature raising processing may, for example, be started when the temperature detected by the temperature sensor for detecting the temperature of the filter 24 (not shown) becomes equal to or more than a preset predetermined temperature.

In this way, when the regeneration processing is performed, the PM deposition amount on the filter 24 gradually decreases and the temperature of the filter 24 gradually falls. On the other hand, when the temperature raising processing is being performed, the PM deposition amount on the filter 24 does not decrease much at all, but the filter 24 rises in temperature. Further, after the timing t4, such regeneration processing and temperature raising processing are alternately repeated, and the PM deposition amount on the filter 24 is gradually decreased. Further, if the PM deposition amount on the filter 24 becomes substantially zero, the secondary air regeneration control is ended.

<<Action and Effects of Secondary Air Regeneration Control>>

In this regard, if feeding air to the filter 24 during the regeneration processing so that the temperature of the filter 24 rises, the PM will rapidly burn, the temperature of the filter 24 will excessively rise, and the filter 24 will be deteriorated. Further, even if controlling the air fed to the filter 24 during the regeneration processing so that the temperature of the filter 24 is maintained constant, the flow rate of feed of air may become more than the suitable rate and the filter 24 may be excessively rise in temperature. In this case as well, the filter 24 will be deteriorated.

As opposed to this, in the secondary air regeneration control of the present embodiment, air is fed to the filter 24 during the regeneration processing so that the temperature of the filter 24 falls. Therefore, even if the amount of air fed from the secondary air feed system 26 deviates somewhat from the target value, the temperature of the filter 24 will not rise during the regeneration processing and accordingly the filter 24 is kept from deteriorating along with an excessive rise in temperature of the filter 24.

On the other hand, in the present embodiment, temperature raising processing is intermittently performed between regeneration processings. Therefore, even if the temperature of the filter 24 falls during the regeneration processing, the temperature of the filter 24 can rise by the temperature raising processing and as a result the temperature of the filter 24 can be maintained at equal to or more than the PM removal start temperature.

1 Further, in the temperature raising processing of the present embodiment, the unburned HC or CO is burned in the filter 24 by the air fed at the downstream side from the exhaust purification catalyst 20, whereby the temperature of the filter 24 rises. Therefore, the temperature of the exhaust purification catalyst 20 will not excessively rise and heat deterioration of the exhaust purification catalyst 20 or heat damage at the engine compartment of the vehicle in which the exhaust purification catalyst 20 is arranged can be suppressed.

<<High-Temperature-Temperature Raising Processing>>

Figure 4:
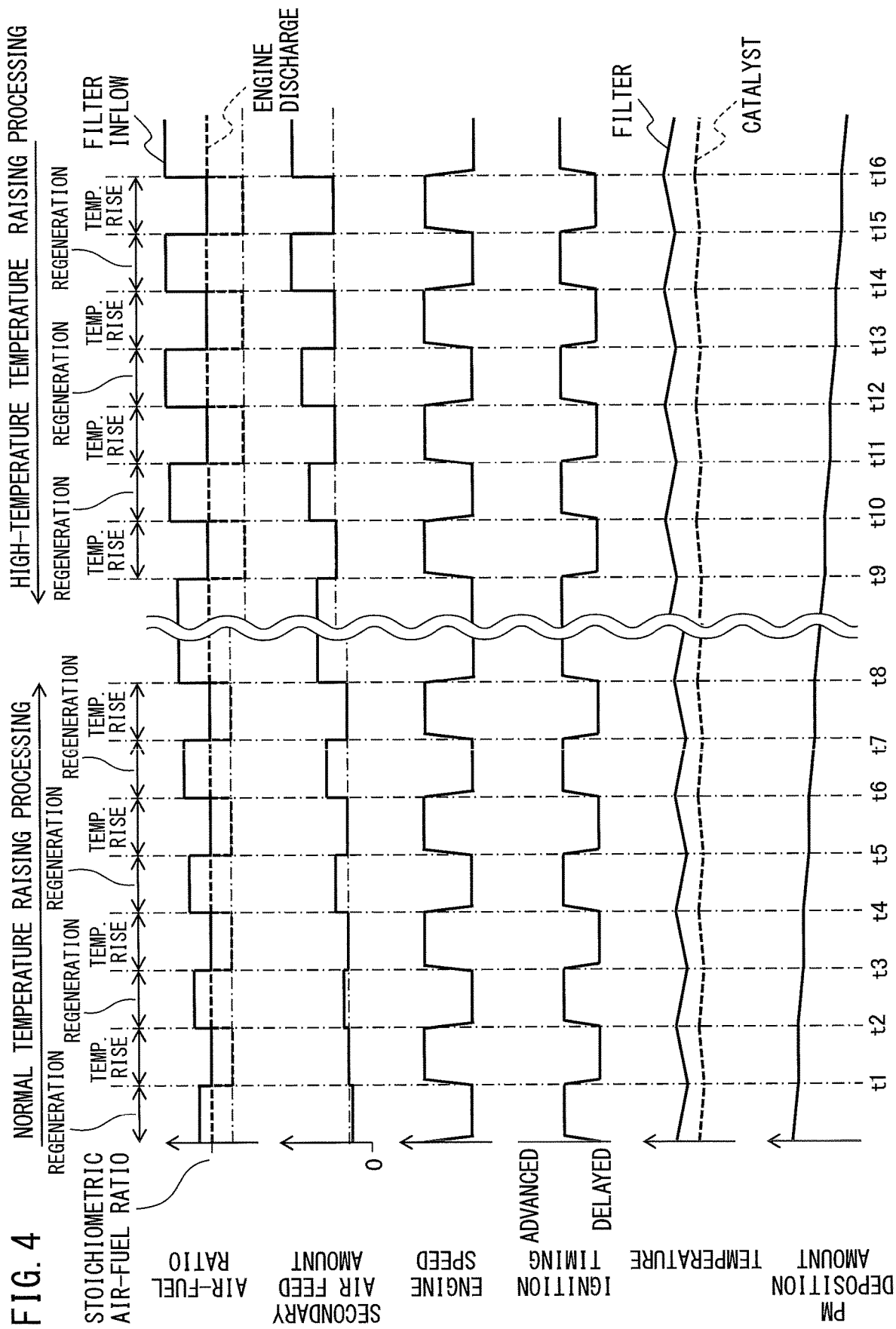
FIG. 4 is a time chart, similar to FIG. 3, showing the trends of parameters when performing PM removal control.

Next, referring to FIG. 4, the high-temperature temperature raising processing in the present embodiment will be explained. FIG. 4 is a time chart, similar to FIG. 3, showing the trends in parameters at the time of performing PM removal control.

In the PM removal control, the PM at the center part of the filter 24 in the diametrical direction is first removed. This is because the outer peripheral part of the filter 24 is easily cooled by releasing heat to the atmosphere, while the center part in the diametrical direction is hard to release heat and is maintained at a high temperature. On the other hand, at the initial stage of the PM removal control, if raising the temperature of the filter 24 so that the outer peripheral part of the filter 24 also becomes high in temperature, the temperature at the center part of the filter 24 becomes too high and the PM deposited on the filter 24 may excessively burn.

Therefore, in the present embodiment, the PM deposition amount on the filter 24 is detected based on the output of the differential pressure sensor 48 and, when the detected PM deposition amount is equal to or less than a preset temperature rise reference amount, the internal combustion engine is controlled so that the peak temperature of the filter 24 due to the temperature raising processing is higher, compared to when it is larger than this temperature rise reference amount. Specifically, in the present embodiment, when the PM deposition amount is equal to or less than the temperature rise reference amount, the rich degree of the air-fuel ratio of the exhaust gas discharged from the engine body 1 in the temperature raising control is larger and the amount of air fed from the secondary air feed system 26 is greater, compared with when it is larger than this temperature rise reference amount.

During the timings t1 to t8 of FIG. 4, the temperature of the filter 24 reached due to the temperature raising processing in the secondary air regeneration control is a relatively high predetermined temperature (for example, 800° C.) as explained above. Below, the temperature raising processing performed so that the temperature of the filter 24 reaches a relatively high predetermined temperature in this way will be called the "normal temperature raising processing". Therefore the temperature raising processing in the secondary air regeneration control explained with reference to FIG. 3 is normal temperature raising processing.

On the other hand, during the timings t9 to t16 of FIG. 4, the temperature raising processing in the secondary air regeneration control is the high-temperature temperature raising processing. Specifically, in the high-temperature temperature raising processing, the amount of injection of fuel from the fuel injectors 11 is controlled so that the rich degree of the air-fuel ratio of the exhaust gas discharged from the engine body 1 is larger, compared with the normal temperature raising processing. Specifically, for example, the amount of injection of fuel from the fuel injectors 11 is controlled so that the air-fuel ratio of the exhaust gas is 12.0. In addition, in the high-temperature temperature raising processing as well, air is fed from the secondary air feed system 26 so that the air-fuel ratio of the exhaust gas flowing into the filter 24 is the stoichiometric air-fuel ratio. Therefore, the flow rate of feed of air from the secondary air feed system 26 in the high-temperature temperature raising processing is greater than the flow rate of feed of air from the secondary air feed system 26 in the normal temperature raising processing.

As a result, in the high-temperature temperature raising processing, a large amount of unburned HC or CO and oxygen flows into the filter 24 compared with the normal temperature raising processing. The unburned HC or CO flowing into the filter 24 together with the oxygen burns, therefore the temperature of the filter 24 greatly rises and therefore the peak temperature of the filter 24 in the high-temperature temperature raising processing is higher than the peak temperature of the filter 24 in the normal temperature raising processing. As a result, the outer peripheral part of the filter 24 becomes a high temperature, and in the subsequent regeneration processing, the PM deposited at the outer peripheral part of the filter 24 can also be oxidized and removed.

Note that, in the above embodiment, the high-temperature temperature raising processing is performed when the detected PM deposition amount is equal to or less than the preset temperature rise reference amount. However, the high-temperature temperature raising processing may also be performed when, for example, the number of times of performing the regeneration processing from when starting the PM removal control is equal to or more than a predetermined reference number of times of temperature rise.

Further, in the above embodiment, the temperature of the filter 24 reached by the temperature raising processing rises in steps in accordance with whether the PM deposition amount is equal to or less than the preset temperature rise reference amount or whether the number of times of performing the regeneration processing is equal to or more than a predetermined number of times. However, the temperature raising processing may be performed so that the temperature of the filter 24 reached by the temperature raising processing becomes higher as the PM deposition amount becomes smaller or as the number of times of performing the regeneration processing becomes greater.

Therefore, in the present embodiment, it can be said that the internal combustion engine is controlled so that the peak temperature of the filter 24 due to the temperature raising control is higher when the PM deposition amount on the filter 24 is relatively small, compared to when it is relatively large. Alternatively, in the present embodiment, the internal combustion engine is controlled so that the peak temperature of the filter 24 due to the temperature raising control is higher when the number of times of performing the regeneration processing from the start of PM removal control is relatively large, compared to when it is relatively small.

<<FC Regeneration Control>>

Figure 5:
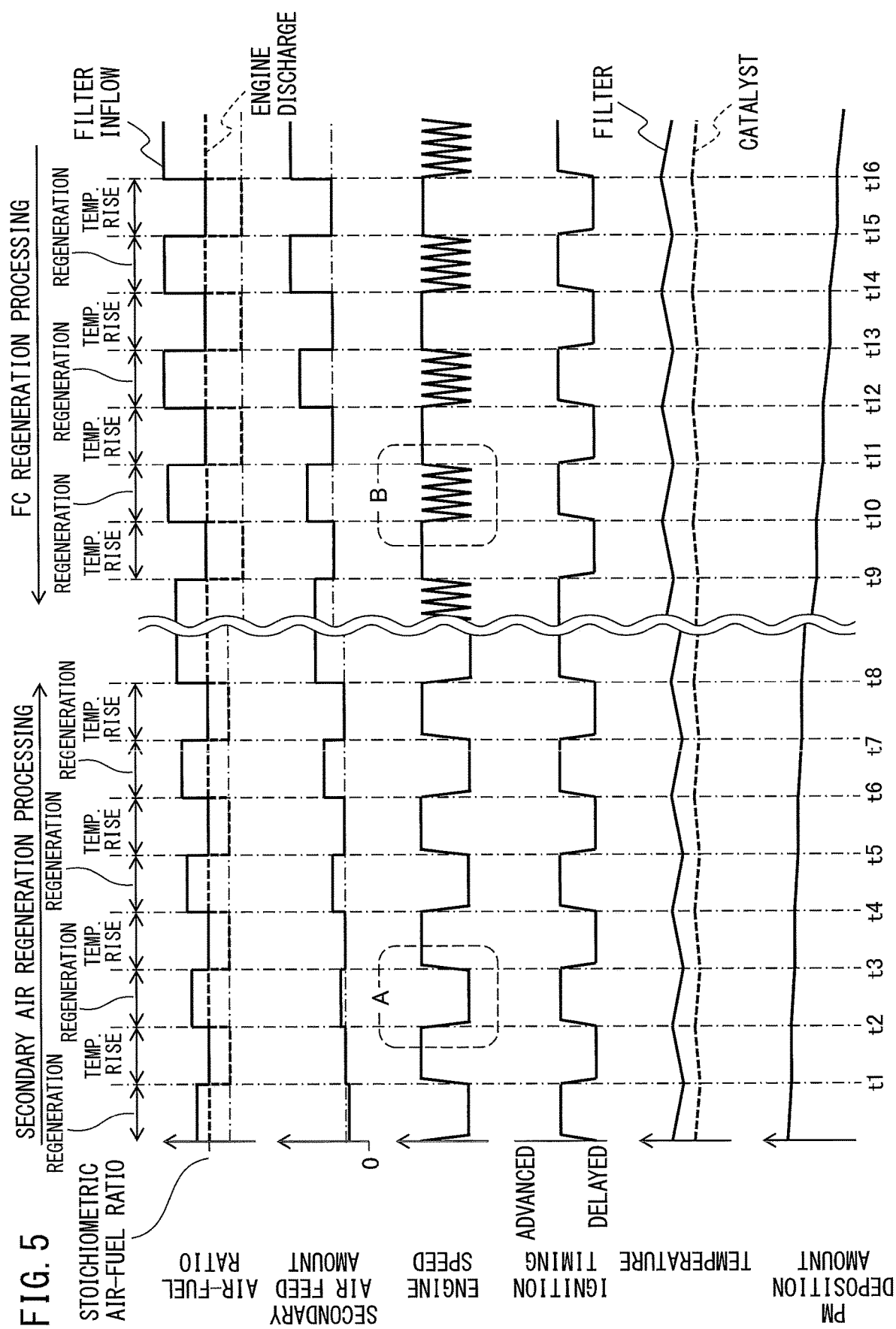
FIG. 5 is a time chart, similar to FIGS. 3 and 4, showing the trends of parameters when performing PM removal and regeneration.
Figure 6:
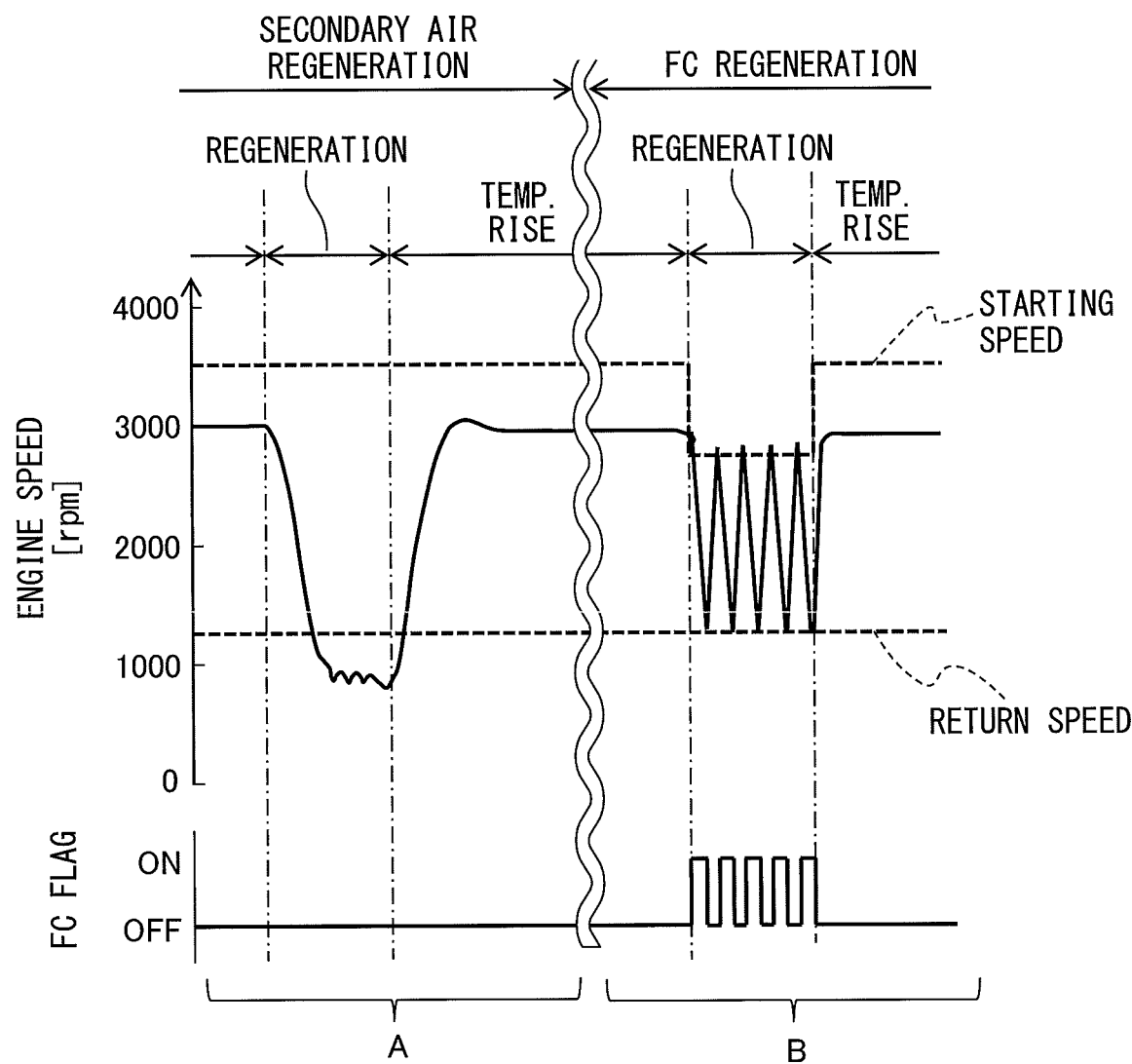
FIG. 6 is a time chart showing an area A and area B of FIG. 5 in an enlarged manner.

Next, referring to FIGS. 5 and 6, FC regeneration control in the present embodiment will be explained. FIG. 5 is a time chart, similar to FIGS. 3 and 4, showing the trends in parameters when performing PM removal regeneration. FIG. 6 is a time chart showing enlarged the areas A and B of FIG. 5.

If continuing the PM removal control, the PM deposited on the filter 24 is gradually removed. If the PM deposition amount on the filter 24 becomes smaller, even if a large amount of air flows into the filter 24 in the regeneration processing, the filter 24 no longer excessively rises in temperature. Further, when the flow rate of the exhaust gas flowing into the filter 24 is small, the exhaust gas mainly flows passing through the center part of the filter 24 in the diametrical direction. On the other hand, when the flow rate of the exhaust gas flowing into the filter 24 is large, a large amount of the exhaust gas also flows to the outer peripheral part of the filter 24 in the diametrical direction. Therefore, after the PM deposited on the filter 24 is decreased by a certain extent due to PM removal control, feeding a large amount of exhaust gas containing oxygen to the filter 24 makes possible to keep down an excessive rise of temperature of the filter 24 while removing PM deposited at the outer peripheral part of the filter 24.

On the other hand, to increase the flow rate of air fed to the filter 24, it may be considered to increase the flow rate of air fed from the secondary air feed system 26. However, to increase the flow rate of air able to be fed by the secondary air feed system 26, it is necessary to increase the capacity of the air pump 28 of the secondary air feed system 26 and the manufacturing cost of the secondary air feed system 26 rises.

Therefore, in the present embodiment, the PM deposition amount on the filter 24 is detected based on the output of the differential pressure sensor 48 and, after the detected PM deposition amount becomes equal to or less than the preset FC reference amount, during performance of the regeneration processing, air is fed from the secondary air feed system 26 and, in addition, fuel cut control, in which the feed of fuel to the internal combustion engine in the state where the internal combustion engine is operated is temporarily stopped, is performed.

During the timings t1 to t8 of FIG. 5, the secondary air regeneration control is performed. In the regeneration processing at this time, fuel cut control is not performed. In this regard, the fuel cut control is started when the engine rotation speed is equal to or more than the FC start rotation speed and is ended when the engine rotation speed reaches the return rotation speed (for example, 1300 rpm). When the secondary air regeneration control is performed, as shown in FIG. 6, the FC start rotation speed is set to a relatively high rotation speed (for example, 3500 rpm). As a result, during the secondary air regeneration control, the engine rotation speed always becomes lower than the FC start rotation speed, therefore regardless of whether the temperature raising processing is underway or the regeneration processing is underway, fuel cut control is not started.

On the other hand, during the timings t9 to t16 of FIG. 5, FC regeneration control is performed. In FC regeneration control, temperature raising processing is performed similarly to the secondary air regeneration control. On the other hand, in regeneration processing, fuel cut control is performed.

Specifically, first, during FC regeneration control, the target engine rotation speed during the regeneration processing is set to a rotation speed higher than the engine rotation speed during temperature raising processing (for example, 3400 rpm). Further, during temperature raising processing of FC regeneration control, the FC start rotation speed is set to a relatively high rotation speed (for example, 3500 rpm) similarly to during the secondary air regeneration control. This rotation speed is higher than the target engine rotation speed during FC regeneration control. Accordingly, fuel cut control is not performed during temperature raising processing.

On the other hand, during the regeneration processing of the FC regeneration control, the FC start rotation speed is set to a rotation speed lower than the FC start rotation speed during the temperature raising processing (for example, 2800 rpm). Therefore, if regeneration processing is started after temperature raising processing during FC regeneration control, the engine rotation speed becomes about the target rotation speed during the temperature raising processing (for example, 3000 rpm), therefore fuel cut control is started (in FIG. 6, FC flag becomes ON).

During fuel cut control, the fuel injectors 11 do not inject fuel, therefore air is discharged from the engine body 1. Therefore, exhaust gas with an extremely high concentration of oxygen flows into the filter 24. As a result, the PM which had deposited at the outer peripheral part of the filter 24 is oxidized and removed.

Then, if the engine rotation speed falls due to the fuel cut control and reaches the return rotation speed (for example, 1300 rpm), the fuel cut control is stopped (in FIG. 6, FC flag becomes OFF) and the operation of the internal combustion engine is resumed. If the operation of the internal combustion engine is resumed, exhaust gas with a low concentration of oxygen is discharged from the engine body 1, but at this time, since air is fed from the secondary air feed system 26, exhaust gas with a relatively high concentration of oxygen flows into the filter 24. Therefore, at this time, the PM deposited on the filter 24 is oxidized and removed.

If operation of the internal combustion engine is resumed, the engine rotation speed rapidly increases and again reaches the FC start rotation speed. If the engine rotation speed reaches the FC start rotation speed, fuel cut control is again started. During FC regeneration control, fuel cut control is repeatedly performed intermittently in this way during the regeneration processing.

In this way, in FC regeneration control, a large amount of oxygen flows into the filter 24 during the regeneration processing. As a result, the PM deposited on the filter 24, in particular, the PM deposited at the outer peripheral part of the filter 24, is oxidized and removed. Further, FC regeneration control is performed after the PM deposition amount on the filter 24 becomes smaller by a certain extent, therefore it is possible to keep the filter 24 from excessively rising in temperature along with combustion of PM.

Note that, in the above embodiment, the PM regeneration control is performed when the detected PM deposition amount is equal to or less than a preset FC reference amount. However, PM regeneration control, for example, may be performed when the number of times of performing regeneration processing from the start of the PM removal control is equal to or more than a predetermined FC reference number of times.

Further, the FC reference amount at which the FC regeneration control is started may be the same as the temperature rise reference amount at which the high-temperature temperature raising processing is started or may be larger than or smaller than the temperature rise reference amount. Similarly, the FC reference number of times at which the FC regeneration control is started may be the same as the temperature rise reference number of times at which the high-temperature temperature raising processing is started or may be larger than or smaller than the temperature rise reference number of times.

<Specific Control>

Below, referring to FIGS. 7 to 15, the specific processing in PM removal control will be explained.

<<Warning Light Activation Processing>>

Figure 7:
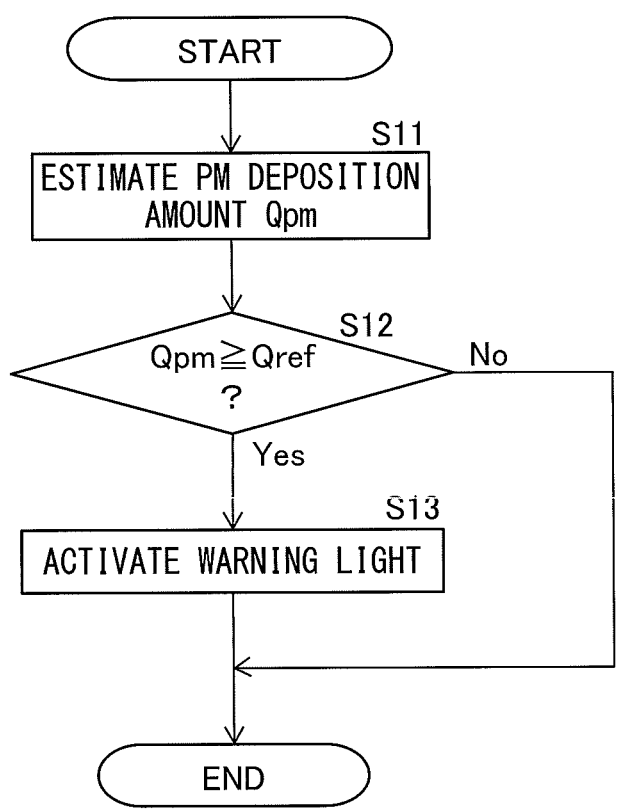
FIG. 7 is a flow chart of a control routine controlling activation of a warning light of a vehicle.

FIG. 7 is a flow chart of a control routine for controlling the activation of a warning light of a vehicle. The illustrated control routine is performed at constant time intervals during the operation of the internal combustion engine accompanying use of the vehicle.

First, at step S11, the PM deposition amount Qpm of the filter 24 is detected. The PM deposition amount Qpm is detected, for example, based on the output of the differential pressure sensor 48. In this case, the greater the differential pressure detected by the differential pressure sensor 48, the greater the PM deposition detected. Note that, the PM deposition amount on the filter 24 may be detected by a deposition detection device detecting the PM deposition amount on the filter 24, other than the differential pressure sensor 48.

Next, at step S12, it is judged if the amount of PM deposition detected at step S11 is equal to or more than a predetermined reference deposition amount Qref. If it is judged at step S12 that the PM deposition amount is less than the reference deposition amount Qref, the control routine is ended.

On the other hand, if it is judged at step S12 that the PM deposition amount is equal to or more than the reference deposition amount Qref, the routine proceeds to step S13. At step S13, a warning light showing that PM removal control is necessary and the vehicle has to be brought to an auto repair shop is activated in the vehicle and the control routine is ended. Note that, at step S13, if the user of the vehicle can be warned, a warning device other than a warning light may also be used.

<<Control of Internal Combustion Engine>>

Figure 8:
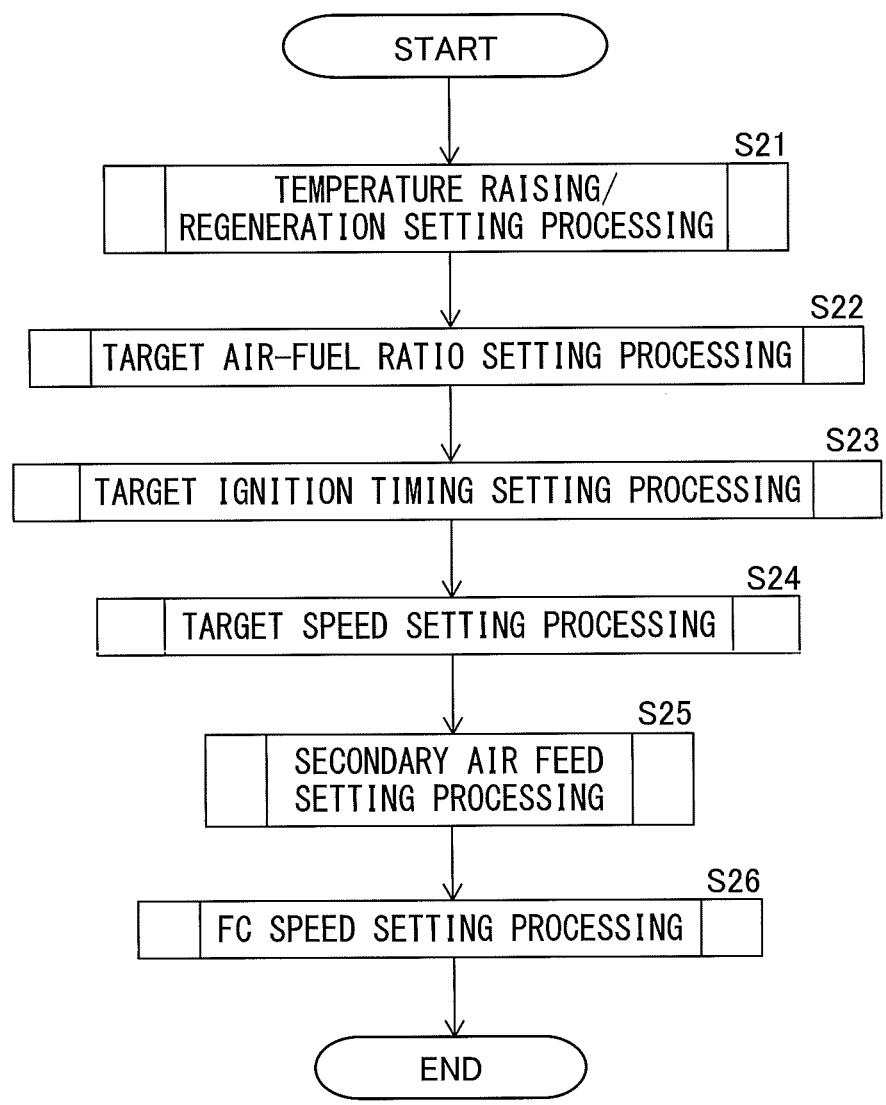
FIG. 8 is a flow chart showing a control routine of an internal combustion engine performed in an auto repair shop.

If a warning light of the vehicle is activated by the control shown in FIG. 7, the user brings the vehicle to an auto repair shop. At this auto repair shop, PM removal control is performed. FIG. 8 is a flow chart showing a control routine of an internal combustion engine performed in an auto repair shop. The illustrated control routine is performed every constant time interval by the ECU 31.

First, at step S21, temperature raising/regeneration setting processing for setting processing performed during PM removal control from temperature raising processing and regeneration processing. Next, at step S22, target air-fuel ratio setting processing for setting the target air-fuel ratio of the exhaust gas discharged from the engine body 1, is performed. Next, at step S23, target ignition timing setting processing for setting the target ignition timing by the spark plugs 10, is performed. At step S24, target rotation speed setting processing for setting the target rotation speed of the internal combustion engine, is performed. Next, at step S25, secondary air feed setting processing for setting the amount of feed of air from the secondary air feed system 26, is performed. Then, at step S26, FC rotation speed setting processing for setting the FC start rotation speed, is performed.

<<Temperature Raising/Regeneration Setting Processing>>

Figure 9:
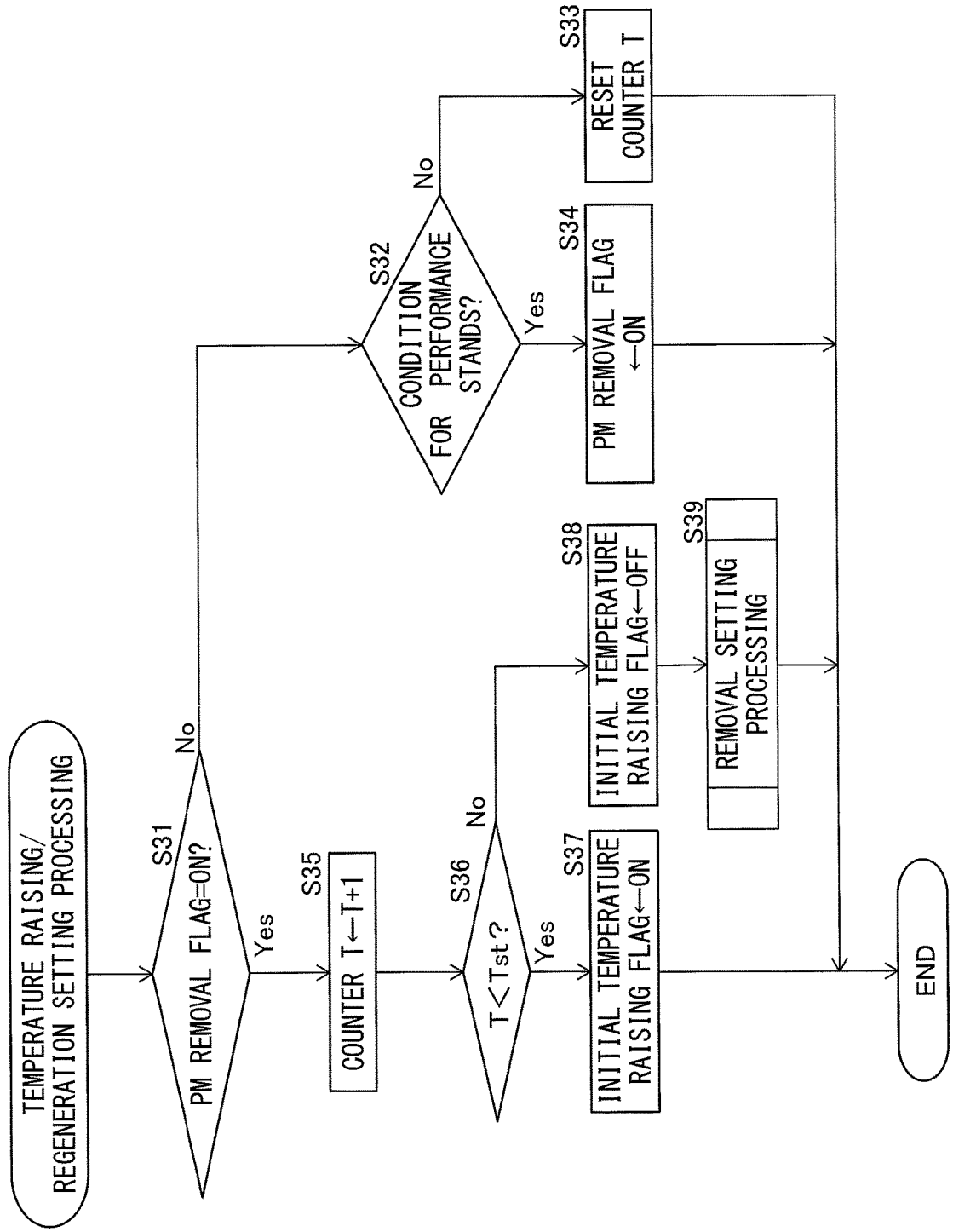
FIG. 9 is a flow chart showing a control routine of processing for raising the temperature and setting regeneration.

FIG. 9 is a flow chart showing the control routine of temperature raising/regeneration setting processing performed at step S21 of FIG. 8. First, at step S31, it is judged if the PM removal flag is ON. The PM removal flag is a flag which is set ON when PM removal control is being performed and which is set OFF otherwise. If it is judged at step S31 that the PM removal flag is not set ON, the routine proceeds to step S32.

At step S32, it is judged if the condition for performance of PM removal control stands. The condition for performance of PM removal control, for example, stands when the condition of the secondary air feed system 26 being attached to the exhaust pipe 22, the condition of the transmission of the vehicle being set to neural, and/or other conditions stand. If it is judged at step S32 that the condition for performance does not stand, the routine proceeds to step S33. At step S33, the counter T showing the time elapsed from the start of PM removal control is reset to zero. On the other hand, if it is judged at step S32 that the condition for performance stands, the routine proceeds to step S34. At step S34, the PM removal flag is set ON and the control routine is ended.

If the PM removal flag is set ON, at the next control routine, the routine proceeds from step S31 to S35. At step S35, the counter T is incremented by "1". Next, at step S36, it is judged if the counter T shows less than a predetermined threshold value Tst. The threshold value Tst corresponds to the time by which the temperature of the filter 24 reaches a predetermined temperature of equal to or more than the PM combustion start temperature due to the initial temperature raising processing. If it is judged at step S36 that the counter T shows less than the threshold value Tst, the routine proceeds to step S37. At step S37, the initial temperature raising flag is set ON and the control routine is ended. The initial temperature raising flag is a flag which is set ON when the initial temperature raising processing should be performed and which is set OFF otherwise.

On the other hand, if it is judged at step S36 that the counter T shows equal to or more than the threshold value Tst, the routine proceeds to step S38. At step S38, the initial temperature raising flag is set OFF, then, at step S39, processing for setting for removal shown in FIG. 10 is performed.

Figure 10:
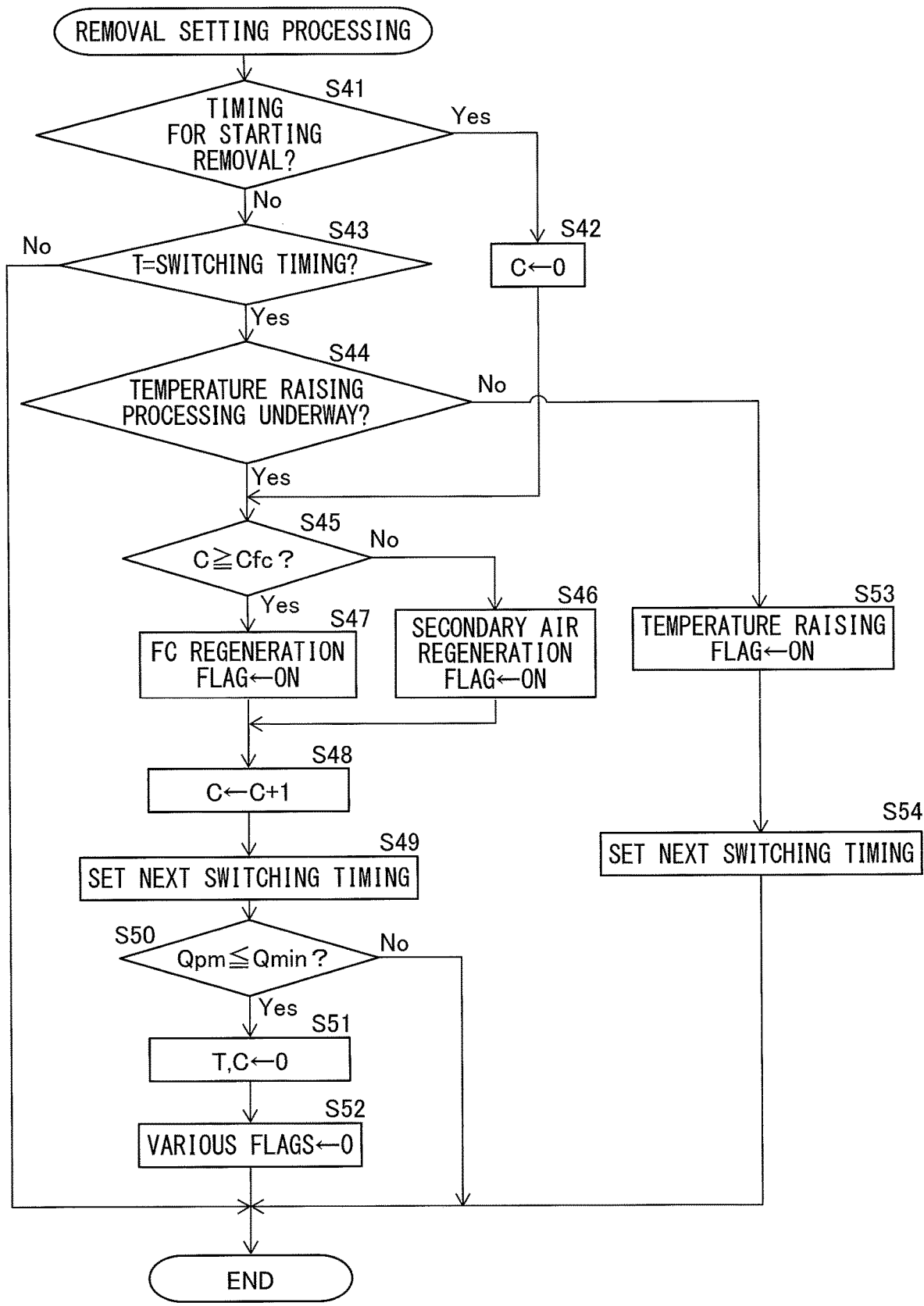
FIG. 10 is a flow chart showing a control routine of setting processing at removal.

FIG. 10 is a flow chart showing a control routine for processing for setting for removal performed at step S39 of FIG. 9. First, at step S41, it is judged if it is timing for start of removal of PM, that is, if it is right after the initial temperature raising processing has ended. If it is judged at step S41 that it is timing for start of removal, the routine proceeds to step S42. At step S42, the regeneration counter C, which counts the number of times of performing regeneration processing from when removal of PM is started, is reset to zero and the routine proceeds to step S45.

At step S45, it is judged if the regeneration counter C shows equal to or more than a preset FC reference number of times Cfc. If it is judged at step S45 that the regeneration counter C is less than the FC reference number of times Cfc, the routine proceeds to step S46. At step S46, the secondary air regeneration flag for performing the secondary air regeneration control is set ON. On the other hand, if it is judged at step S45 that the regeneration counter C is equal to or more than the FC reference number of times Cfc, the routine proceeds to step S47. At step S47, the FC regeneration flag for performing FC regeneration control is set ON. Note that, if the secondary air regeneration flag is set ON, the FC regeneration flag and the later explained temperature raising flag are set OFF. Further, if the FC regeneration flag is set ON, the secondary air regeneration flag and temperature raising flag are set OFF.

Then, at step S48, the regeneration counter C is incremented by "1". At step S49, the next timing of switching from the regeneration processing to the temperature raising processing (that is, the duration time of performing regeneration processing) is set. The next timing of switching to the temperature raising processing is, for example, set to after 10 seconds from the start of the regeneration processing.

Next, at step S50, it is judged if the PM deposition amount Qpm on the filter 24 detected based on the differential pressure sensor 48, etc., is equal to or less than a minimum deposition amount Qmin, that is, if the PM deposition amount is substantially zero. When the PM deposition amount Qpm on the filter 24 is greater than the minimum deposition amount Qmin, the control routine is ended.

At the next control routine, it is judged that it is not timing for start of removal at step S41, and the routine proceeds to step S43. At step S43, it is judged if the counter T has reached a switching timing set at step S49 of the previous control routine. If it is judged that the counter T has not reached the switching timing, the control routine is ended. On the other hand, if it is judged that the counter T has reached the switching timing, the routine proceeds to step S44. At step S44, it is judged if the temperature raising processing is currently underway. If it is judged at step S44 that the temperature raising processing is currently underway, the routine proceeds to step S45. On the other hand, if it is judged at step S44 that the temperature raising processing is not underway (that is, if regeneration processing is underway), the routine proceeds to step S53.

At step S53, a temperature raising flag for performing temperature raising processing is set ON, then the next timing for switching from the temperature raising processing to the regeneration processing (that is, the duration time for performing temperature raising processing) is set. The next timing for switching to the regeneration processing is, for example, set to after 20 seconds from the start of temperature raising processing. Note that, if the temperature raising flag is set ON, the secondary air regeneration flag and FC regeneration flag are set OFF.

Then, if the regeneration processing and the temperature raising processing are repeatedly performed and the PM deposition amount Qpm on the filter 24 becomes equal to or less than the minimum deposition amount Qmin, at the next control routine, the routine proceeds from step S50 to step S51. At step S51, the counter T and regeneration counter C are reset to zero, the FC regeneration flag, secondary air regeneration flag, temperature raising flag, and other various flags are set OFF, and the control routine is ended.

<<Target Air-Fuel Ratio Setting Processing>>

Figure 11:
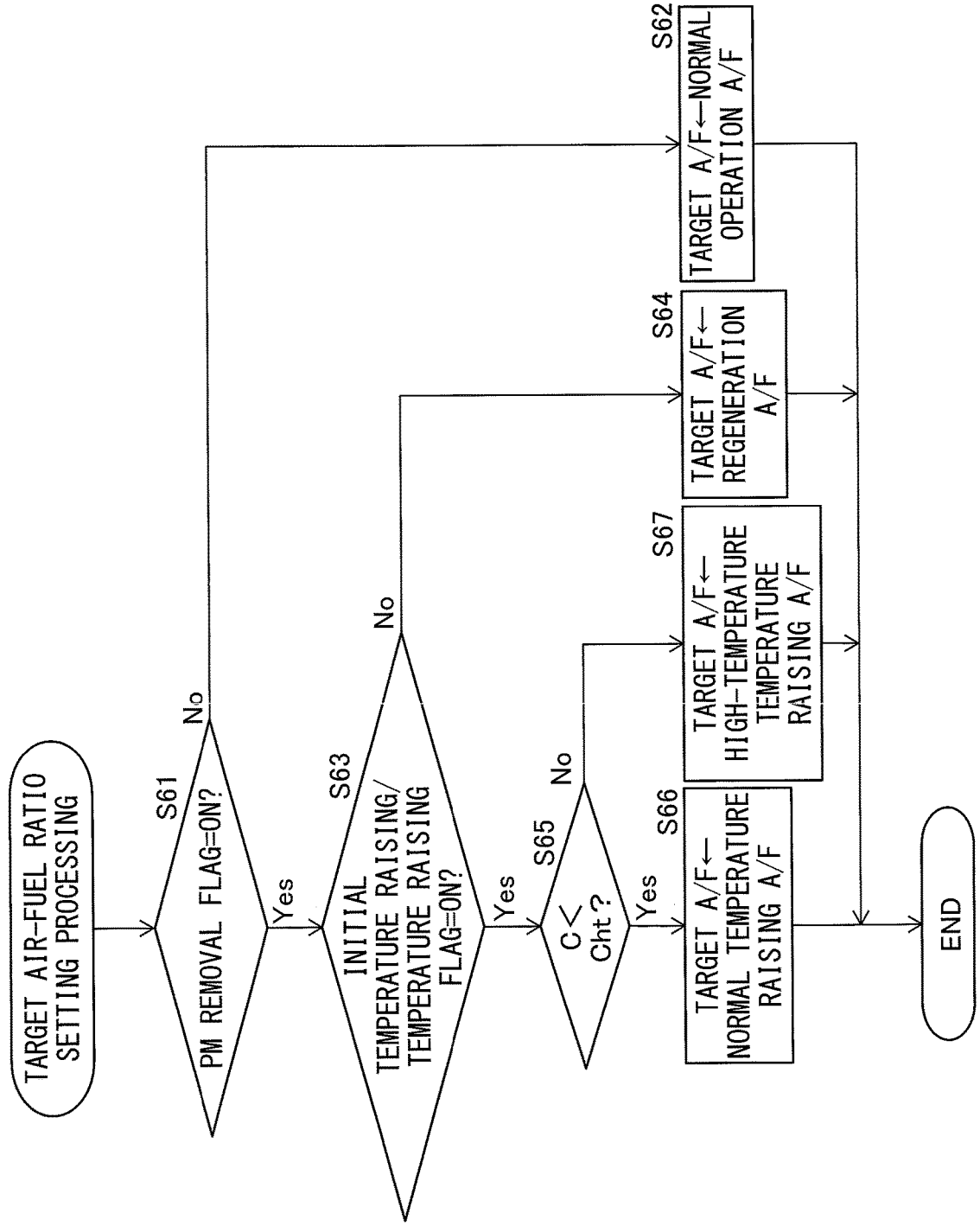
FIG. 11 is a flow chart showing a control routine of processing for setting a target air-fuel ratio.

FIG. 11 is a flow chart showing a control routine of processing for setting a target air-fuel ratio performed at step S22 of FIG. 8. First, at step S61, it is judged if the PM removal flag has been set ON. If it is judged at step S61 that the PM removal flag has not been set ON, the routine proceeds to step S62. At step S62, the target air-fuel ratio of the exhaust gas discharged from the engine body 1 is set to an air-fuel ratio for normal operation (for example, 14.6) and the control routine is ended.

On the other hand, if it is judged at step S61 that the PM removal flag is set ON, the routine proceeds to step S63. At step S63, it is judged if the initial temperature raising flag or temperature raising flag is set ON. If it is judged at step S63 that both of the initial temperature raising flag and temperature raising flag have been set OFF, the routine proceeds to step S64. At step S64, the target air-fuel ratio of the exhaust gas discharged from the engine body 1 is set to the air-fuel ratio for regeneration (for example, 14.6), and the control routine is ended.

If it is judged at step S63 that at least one of the initial temperature raising flag and temperature raising flag is set ON, the routine proceeds to step S65. At step S65, it is judged if the regeneration counter C is less than the reference number of times Cht of raising temperature. If it is judged at step S65 that the regeneration counter C is less than the reference number of times Cht of raising temperature, the routine proceeds to step S66. At step S66, the target air-fuel ratio of the exhaust gas discharged from the engine body 1 is set to the air-fuel ratio for normal temperature raising (for example, 12.5), and the control routine is ended. On the other hand, if it is judged at step S65 that the regeneration counter C is equal to or more than the reference number of times Cht of raising temperature, the routine proceeds to step S67. At step S67, the target air-fuel ratio of the exhaust gas discharged from the engine body 1 is set to the air-fuel ratio for the high-temperature temperature raising (for example, 12.0), and the control routine is ended.

<<Target Ignition Timing Setting Processing>>

Figure 12:
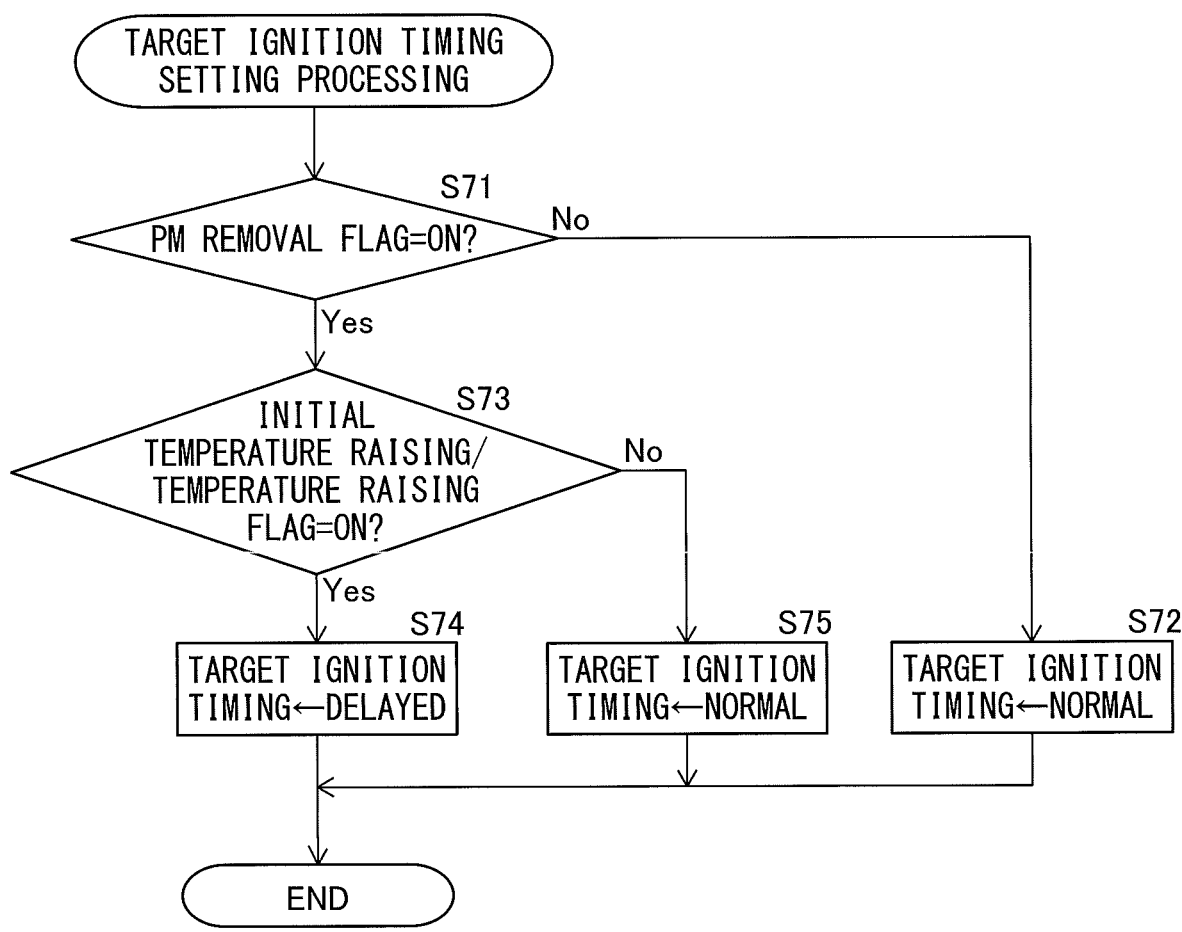
FIG. 12 is a flow chart showing a control routine of processing for setting a target ignition timing.

FIG. 12 is a flow chart showing a control routine of processing for setting a target ignition timing performed at step S23 of FIG. 8. First, at step S71, it is judged if the PM removal flag has been set ON. If it is judged at step S71 that the PM removal flag has not been set ON, the routine proceeds to step S72. At step S72, the target ignition timing of the spark plug 10 is set to the normal ignition timing, and the control routine is ended.

On the other hand, if it is judged at step S71 that the PM removal flag is set ON, the routine proceeds to step S73. At step S73, it is judged if the initial temperature raising flag or temperature raising flag is set ON. If it is judged at step S73 that either of the initial temperature raising flag and temperature raising flag is set ON, the routine proceeds to step S74. At step S74, the target ignition timing of the spark plug 10 is set to an ignition timing delayed from the above-mentioned normal ignition timing, and the control routine is ended.

On the other hand, if it is judged at step S73 that both of the initial temperature raising flag and temperature raising flag are set OFF, the routine proceeds to step S75. At step S75, the target ignition timing of the spark plug 10 is set to the above-mentioned normal ignition timing, and the control routine is ended.

<<Target Rotation Speed Setting Processing>>

Figure 13:
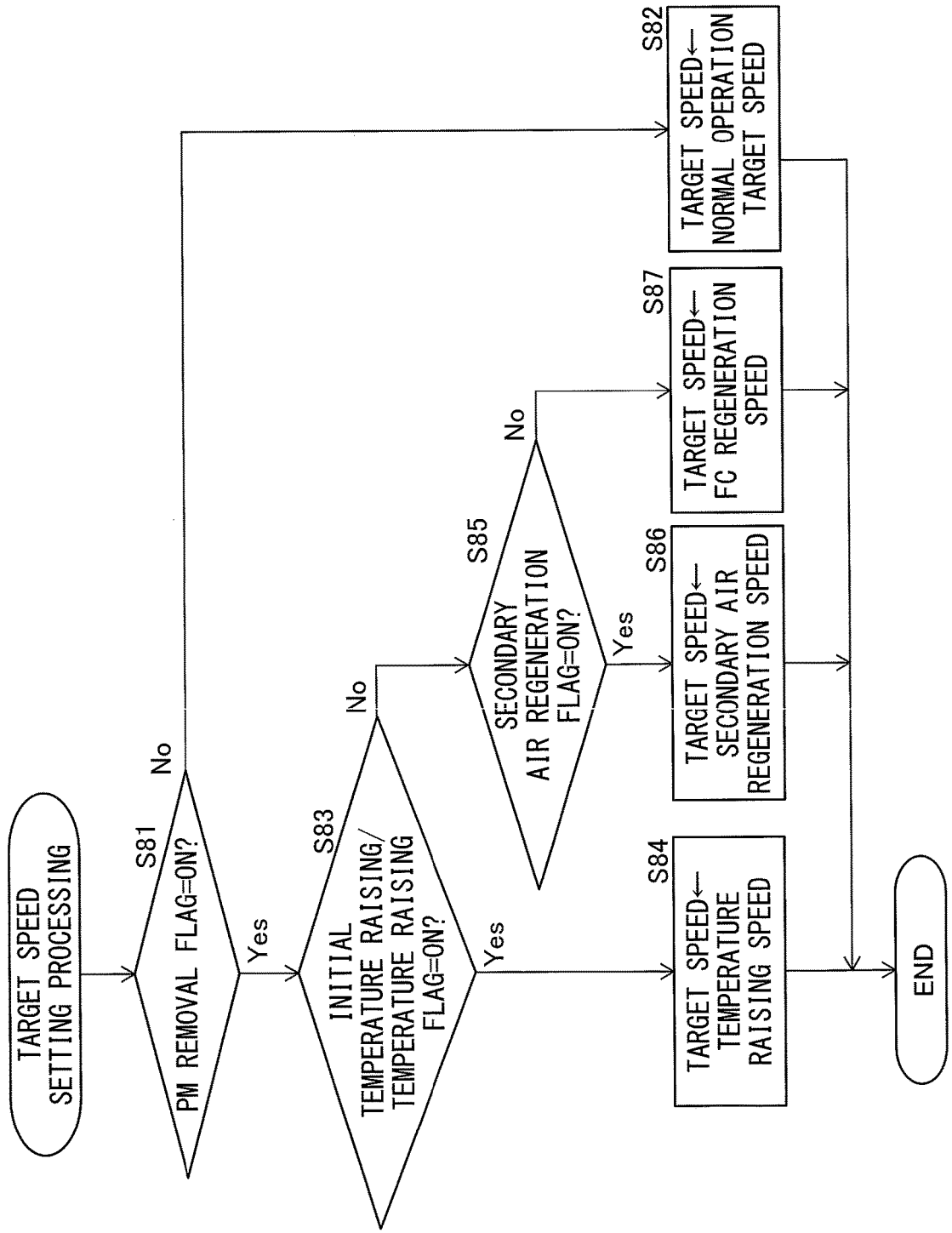
FIG. 13 is a flow chart showing a control routine of processing for setting a target rotation speed.

FIG. 13 is a flow chart showing a control routine of processing for setting a target rotation speed performed at step S24 of FIG. 8. First, at step S81, it is judged if the PM removal flag is set ON. If it is judged at step S81 that the PM removal flag is not set ON, the routine proceeds to step S82. At step S82, the target engine rotation speed is set to a rotation speed for normal operation (for example, 600 rpm), and the control routine is ended.

On the other hand, if it is judged at step S81 that the PM removal flag is set ON, the routine proceeds to step S83. At step S83, it is judged if the initial temperature raising flag or temperature raising flag is set ON. If it is judged at step S83 that at least one of the initial temperature raising flag and temperature raising flag is set ON, the routine proceeds to step S84. At step S84, the target engine rotation speed is set to a rotation speed for temperature raising (for example, 3000 rpm), and the control routine is ended.

On the other hand, if it is judged at step S83 that both of the initial temperature raising flag and temperature raising flag have been set OFF, the routine proceeds to step S85. At step S85, it is judged if the secondary air regeneration flag has been set ON. If it is judged at step S85 that the secondary air regeneration flag has been set ON, the routine proceeds to step S86. At step S86, the target engine rotation speed is set to a rotation speed for secondary air regeneration (for example, 1000 rpm), and the control routine is ended. On the other hand, if it is judged at step S85 that the secondary air regeneration flag has not been set ON, the routine proceeds to step S87. At step S87, the target engine rotation speed is set to the rotation speed for FC regeneration (for example, 3400 rpm), and the control routine is ended.

<<Secondary Air Feed Setting Processing>>

Figure 14:
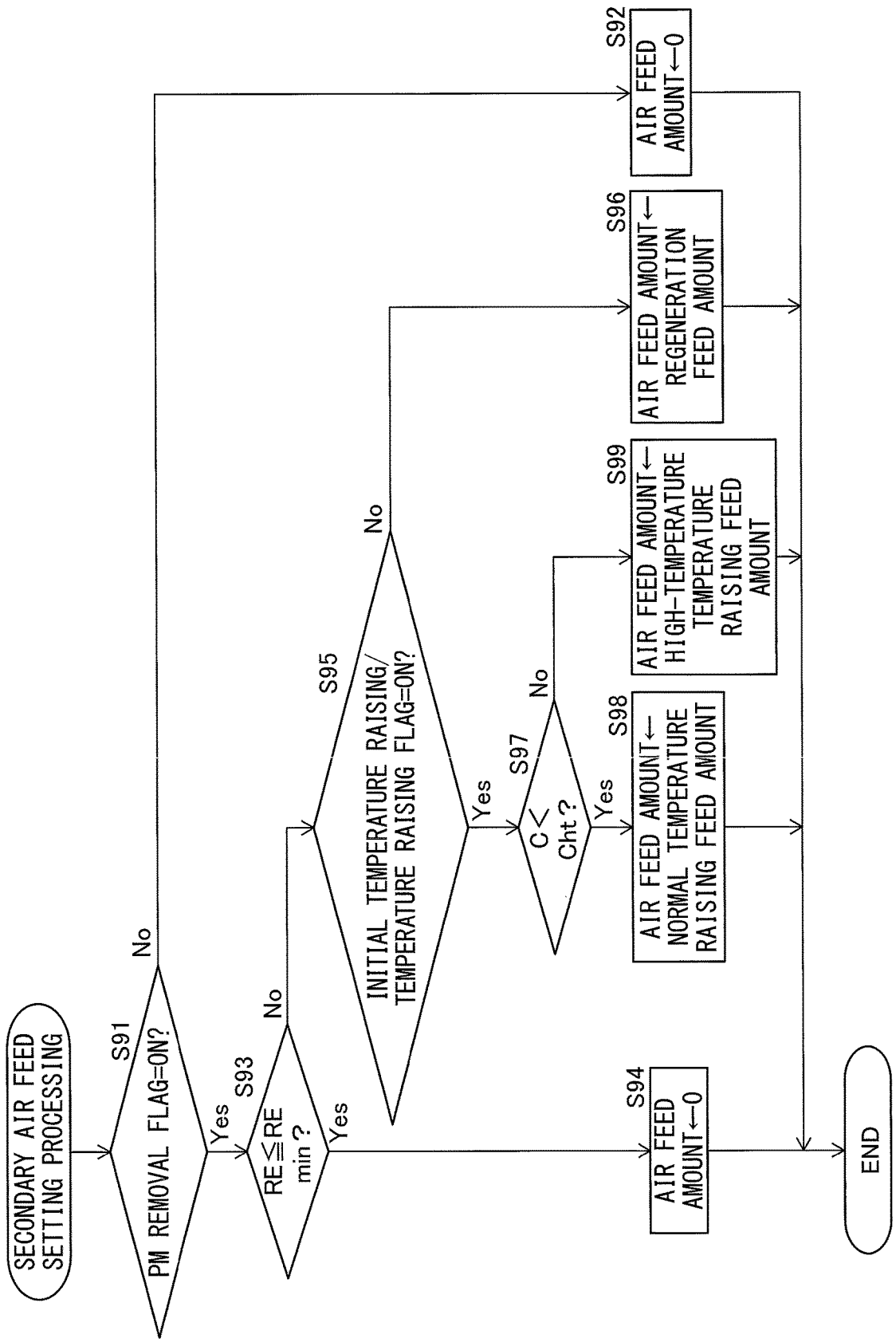
FIG. 14 is a flow chart showing a control routine of processing for setting an amount of feed of secondary air.

FIG. 14 is a flow chart showing the control routine of processing for setting the amount of feed of secondary air performed at step S25 of FIG. 8. First, at step S91, it is judged if the PM removal flag has been set ON. If it is judged at step S91 that the PM removal flag has not been set ON, the routine proceeds to step S92. At step S92, the target amount of feed of air from the secondary air feed system 26 is set to zero, and the control routine is ended.

On the other hand, if it is judged at step S91 that the PM removal flag is set ON, the routine proceeds to step S93. At step S93, it is judged if the current engine rotation speed RE is equal to or less than a minimum reference rotation speed REmin (for example, 500 rpm). The current engine rotation speed RE is calculated based on the output of the crank angle sensor 44. If it is judged at step S93 that the engine rotation speed RE is equal to or less than the minimum reference rotation speed REmin, the routine proceeds to step S94. At step S94, the target amount of feed of air from the secondary air feed system 26 is set to zero, and the control routine is ended.

In this regard, during regeneration control, the burned exhaust gas flowing into the filter 24 (exhaust gas burned in combustion chambers 5) robs heat from the filter 24. Due to this, at the filter 24, even if PM is burned, the temperature of the filter 24 falls. In this regard, however, if the engine rotation speed is low and the burned exhaust gas flowing into the filter 24 is small in amount, it is hard to dissipate heat from the filter 24. For this reason, at this time, if feeding air from the secondary air feed system 26 to burn the PM deposited on the filter 24, there is a possibility of the filter 24 excessively rising in temperature. As opposed to this, in the present embodiment, when the engine rotation speed is low, air is not fed from the secondary air feed system 26 to the filter 24, therefore it is possible to keep the filter 24 from excessively rising in temperature.

Note that, in the above embodiment, at step S94, the target flow rate of feed of air from the secondary air feed system 26 is set to zero. However, at step S94, the flow rate of feed of air from the secondary air feed system may also be set smaller, compared to when the engine rotation speed is higher than a reference rotation speed.

On the other hand, if it is judged at step S93 that the engine rotation speed RE is higher than a minimum reference rotation speed REmin, the routine proceeds to step S95. At step S95, it is judged if the initial temperature raising flag or temperature raising flag is set ON. If it is judged at step S95 that both of the initial temperature raising flag and temperature raising flag have been set OFF, the routine proceeds to step S96. At step S96, the target amount of feed of air from the secondary air feed system 26 is set to the amount of feed for regeneration processing, and the control routine is ended.

On the other hand, if it is judged at step S95 that at least one of the initial temperature raising flag and temperature raising flag is set ON, the routine proceeds to step S97. At step S97, it is judged if the regeneration counter C is less than the reference number of times Cht of raising temperature. If it is judged at step S97 that the count of the regeneration counter C is less than the reference number of times Cht of raising temperature, the routine proceeds to step S98. At step S98, the target amount of feed of air from the secondary air feed system 26 is set to the amount of feed for normal temperature raising processing, and the control routine is ended. On the other hand, if it is judged at step S97 that the regeneration counter C is equal to or more than the reference number of times Cht of raising temperature, the routine proceeds to step S99. At step S99, the target amount of feed of air from the secondary air feed system 26 is set to an amount of feed for high-temperature temperature raising processing, which is greater than the amount of feed for normal temperature raising processing, and the control routine is ended. Note that, the amount of feed for normal temperature raising processing and the amount of feed for high-temperature temperature raising processing may also be set to become greater, as the number of times of performance of the regeneration processing (as the count of the regeneration counter C becomes greater) becomes greater.

<<FC Rotation Speed Setting Processing>>

Figure 15:
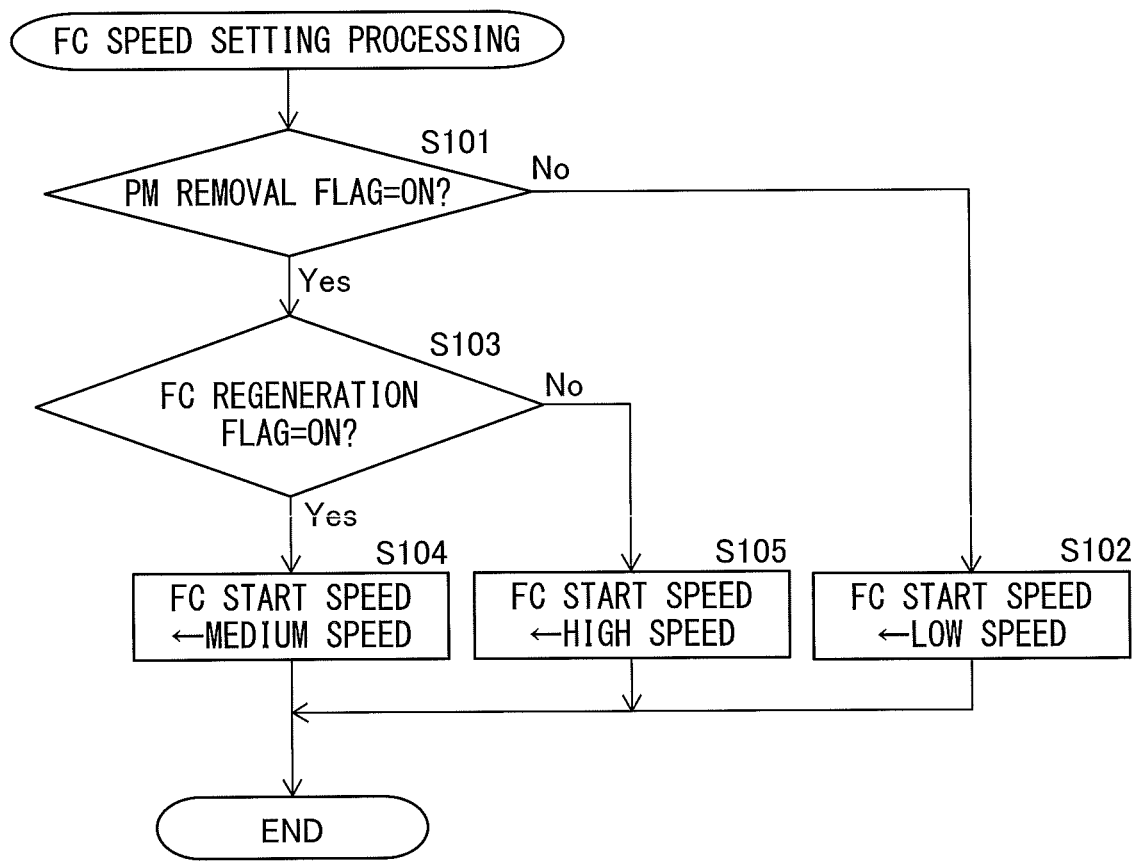
FIG. 15 is a flow chart showing a control routine of processing for setting an FC rotation speed.

FIG. 15 is a flow chart showing a control routine of processing for setting an FC rotation speed performed at step S26 of FIG. 8. First, at step S101, it is judged if the PM removal flag is ON. If it is judged at step S101 that the PM removal flag is not set ON, the routine proceeds to step S102. At step S102, the FC start rotation speed is set to a relatively low rotation speed (for example, 2500 rpm), and the control routine is ended.

On the other hand, if it is judged at step S101 that the PM removal flag is set ON, the routine proceeds to step S103. At step S103, it is judged if the FC regeneration flag is set ON. If it is judged at step S103 that the FC regeneration flag is set ON, the routine proceeds to step S104. At step 104, the FC start rotation speed is set to an intermediate degree of rotation speed (for example, 2800 rpm), and the control routine is ended.

On the other hand, if it is judged at step S103 that the FC regeneration flag is set OFF, the routine proceeds to step S105. At step S105, the FC start rotation speed is set to a relatively high rotation speed (for example, 3500 rpm) and the control routine is ended.

The invention claimed is:

1. A control device of an internal combustion engine for controlling an internal combustion engine, the engine comprising a particulate filter arranged in an exhaust passage of the internal combustion engine and configured to enable attachment of a secondary air feed system feeding air into exhaust gas flowing into the particulate filter, wherein
the control device of an internal combustion engine is configured, in the PM removal control for removing particulate matter deposited on the particulate filter, to perform temperature raising processing for controlling the internal combustion engine so that the air-fuel ratio of the exhaust gas discharged from the engine body is a rich air-fuel ratio richer than the stoichiometric air-fuel ratio and for feeding air from the secondary air feed system, and to perform regeneration processing for controlling the internal combustion engine so that the air-fuel ratio of the exhaust gas discharged from the engine body is leaner than an air-fuel ratio during the temperature raising processing and for feeding air from the secondary air feed system so that the air-fuel ratio of the exhaust gas flowing into the particulate filter is a lean air-fuel ratio leaner than the stoichiometric air-fuel ratio, so that the temperature of the particulate filter decreases.

2. The control device of an internal combustion engine according to claim 1, wherein the control device is configured to repeatedly perform the temperature raising processing and the regeneration processing, in the PM removal control.

3. The control device of an internal combustion engine according to claim 1, wherein control device controls the secondary air feed system so that in the regeneration processing the flow rate of feed of air from the secondary air feed system is greater when the amount of deposition of particulate matter at the particulate filter is relatively small, compared to when it is relatively large.

4. The control device of an internal combustion engine according to claim 1, wherein the control device controls the secondary air feed system so that in regeneration processing the flow rate of feed of air from the secondary air feed system is greater when the number of times of performing the regeneration processing from the start of PM removal control is relatively large, compared to when it is relatively small.

5. The control device of an internal combustion engine according to claim 1, wherein the control device feeds air from the secondary air feed system so that in the temperature raising processing, the air-fuel ratio of the exhaust gas flowing into the particulate filter is the stoichiometric air-fuel ratio.

6. The control device of an internal combustion engine according to claim 1, wherein
the internal combustion engine further comprises spark plugs igniting an air-fuel mixture in combustion chambers, and the control device delays the ignition timing by the spark plugs during the temperature raising processing from the ignition timing by the spark plugs during the regeneration processing.

7. The control device of an internal combustion engine according to claim 1, wherein the control device controls the internal combustion engine so that the rotation speed of the internal combustion engine in the temperature raising processing is higher than the rotation speed of the internal combustion engine during the regeneration processing.

8. The control device of an internal combustion engine according to claim 1, wherein the control device controls the internal combustion engine and the secondary air feed system so that a peak temperature of the filter due to the temperature raising processing is higher when the amount of deposition of the particulate matter to the particulate filter is relatively small, compared to when it is relatively large.

9. The control device of an internal combustion engine according to claim 1, wherein the control device controls the internal combustion engine and the secondary air feed system so that a peak temperature of the filter due to the temperature raising processing is higher when the number of times of performing regeneration processing from the start of PM removal control is relatively large, compared to when it is relatively small.

10. The control device of an internal combustion engine according to claim 1, wherein the control device performs fuel cut control for temporarily stopping the feed of fuel to the internal combustion engine in the state where the internal combustion engine is operated, during regeneration processing after the amount of deposition of particulate matter at the particulate filter becomes equal to or less than a predetermined amount.

11. The control device of an internal combustion engine according to claim 1, wherein the control device performs fuel cut control for temporarily stopping the feed of fuel to the internal combustion engine in the state where the internal combustion engine is operated, during regeneration processing after the number of times of performing regeneration processing from the start of PM removal control becomes equal to or more than a predetermined number of times.

12. The control device of an internal combustion engine according to claim 1, wherein the control device reduces the flow rate of feed of air from the secondary air feed system or stops the feed of air from the secondary air feed system, when the rotation speed of the internal combustion engine falls to equal to or less than a preset reference rotation speed during PM removal control, compared to when it is higher than the reference rotation speed.

13. An internal combustion engine comprising a control device according to claim 1 and a particulate filter arranged in an exhaust passage, wherein
the internal combustion engine is configured to enable a secondary air feel system to be attached to feed air into the exhaust gas flowing into the particulate filter, and the secondary air feed system is not attached to the internal combustion engine when the PM removal control is not performed.

14. A vehicle mounting an internal combustion engine and a control device according to claim 1, wherein
the vehicle comprises a device for warning a user of the vehicle,
the internal combustion engine comprises a deposition detection device for detecting an amount of deposition of particulate matter on a particulate filter, and
the control device issues a warning, which shows that the user should perform PM removal control, by the warning device, when the amount of deposition of particulate matter detected by the deposition detection device is equal to or more than a preset reference amount.

* * * * *